Sept. 7, 1965 C. H. CLARK ETAL 3,205,305
PLANETARY RECORDING APPARATUS
Filed Dec. 6, 1961 13 Sheets-Sheet 1
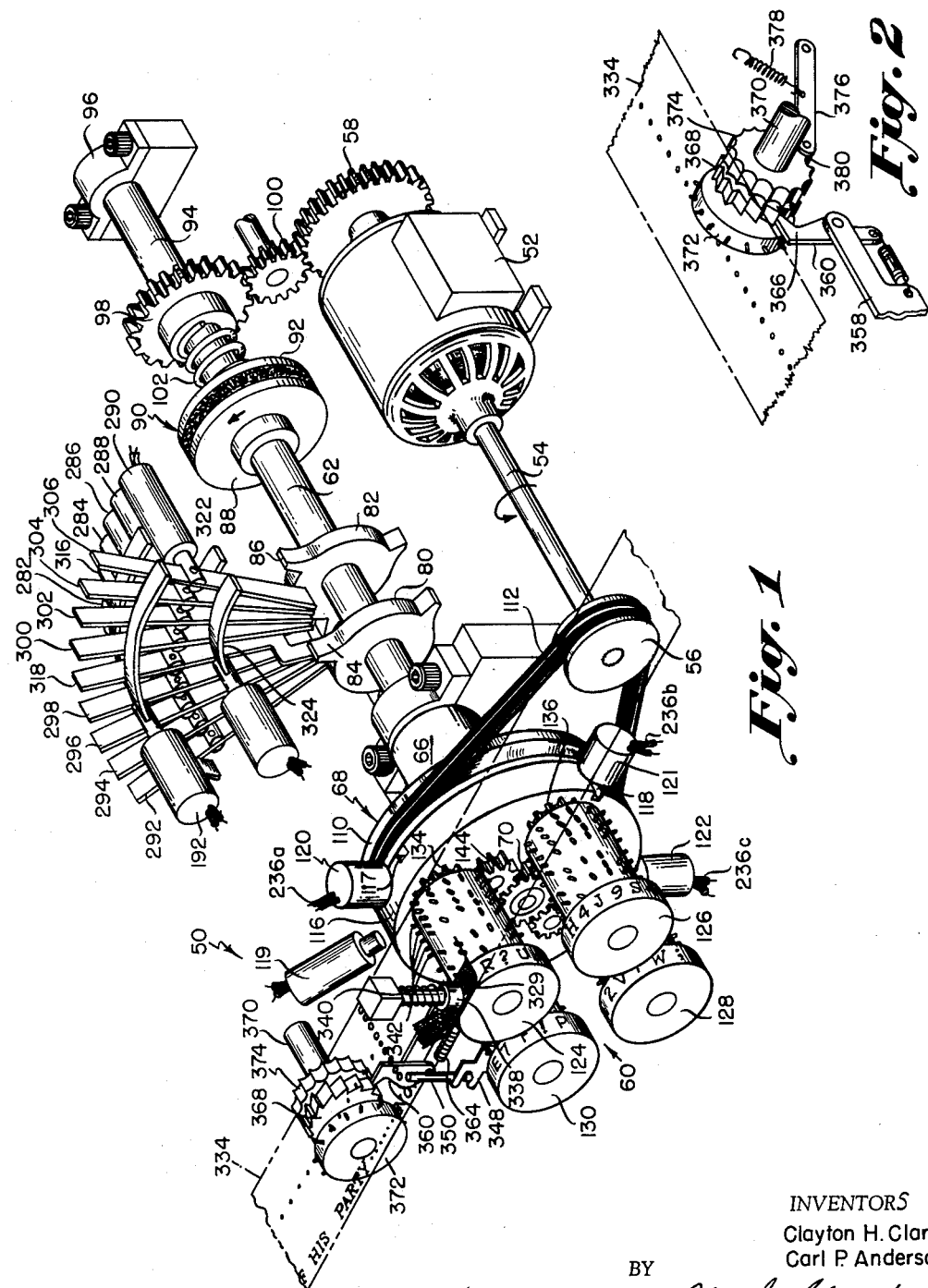
INVENTORS
Clayton H. Clark
Carl P. Anderson
BY
Attorneys INVENTOR.
Clayton H. Clark
Carl P. Anderson INVENTORS
Clayton H. Clark
Carl P. Anderson
BY
Attorneys

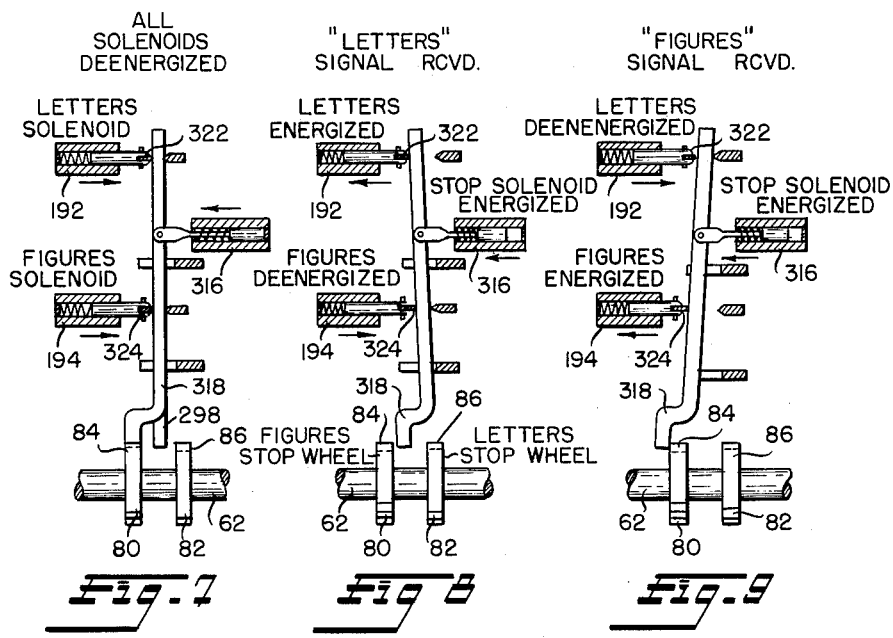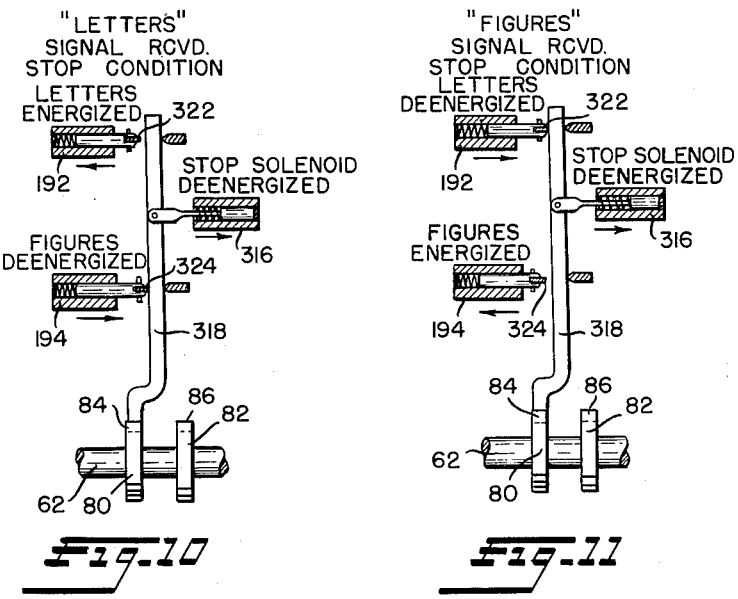

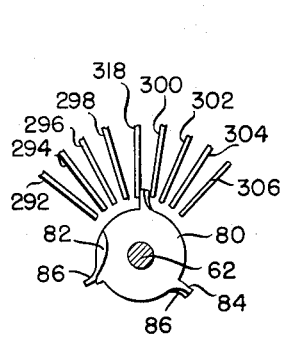
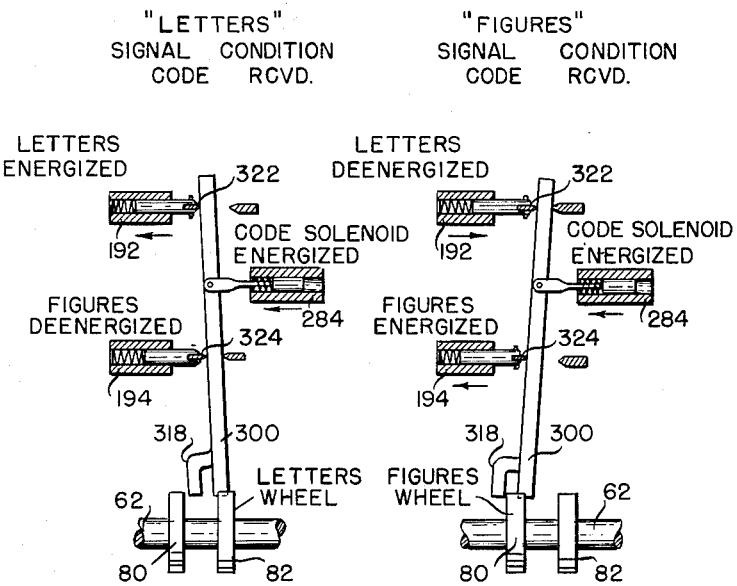
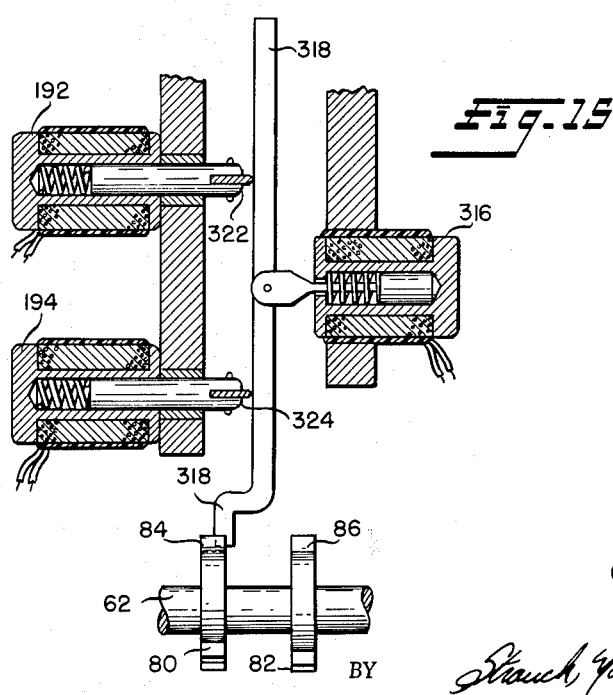

Sept. 7, 1965 C. H. CLARK ETAL 3,205,305
PLANETARY RECORDING APPARATUS
Filed Dec. 6, 1961 13 Sheets-Sheet 6

INVENTORS
Clayton H. Clark
Carl P. Anderson
BY
Attorneys

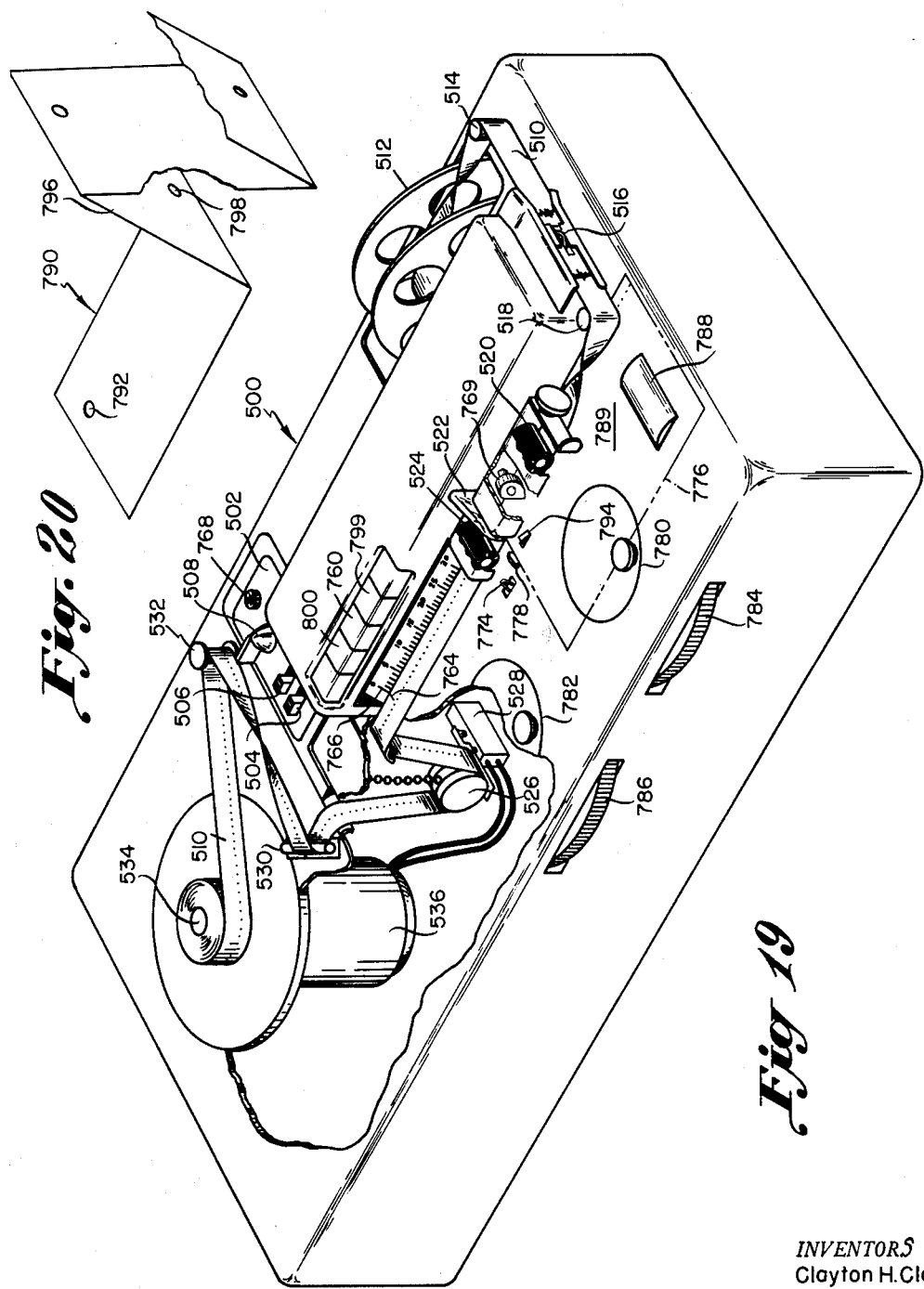

INVENTOR.
Clayton H. Clark
Carl P. Anderson

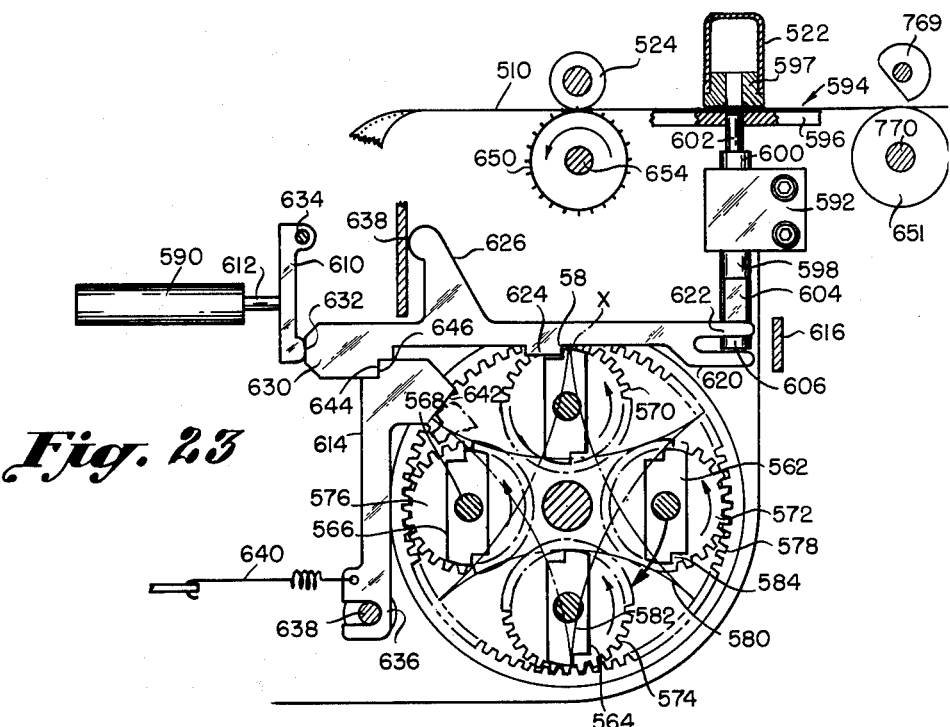

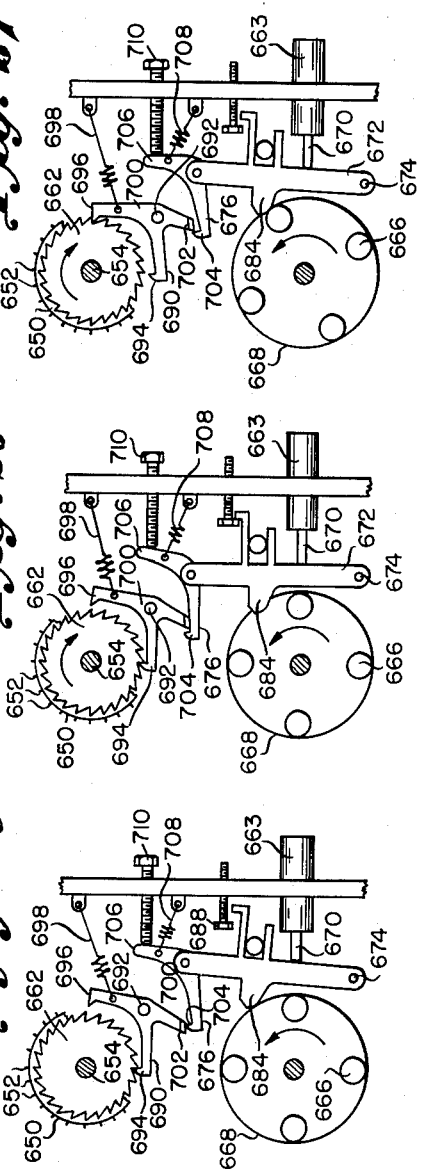

Sept. 7, 1965   C. H. CLARK ETAL   3,205,305
PLANETARY RECORDING APPARATUS
Filed Dec. 6, 1961   13 Sheets-Sheet 11

INVENTORS
Clayton H. Clark
Carl P. Anderson
BY
Strauch, Nolan & Hale
Attorneys

Sept. 7, 1965 C. H. CLARK ETAL 3,205,305
PLANETARY RECORDING APPARATUS
Filed Dec. 6, 1961 13 Sheets-Sheet 12

INVENTORS
Clayton H. Clark
Carl P. Anderson

BY
ATTORNEYS

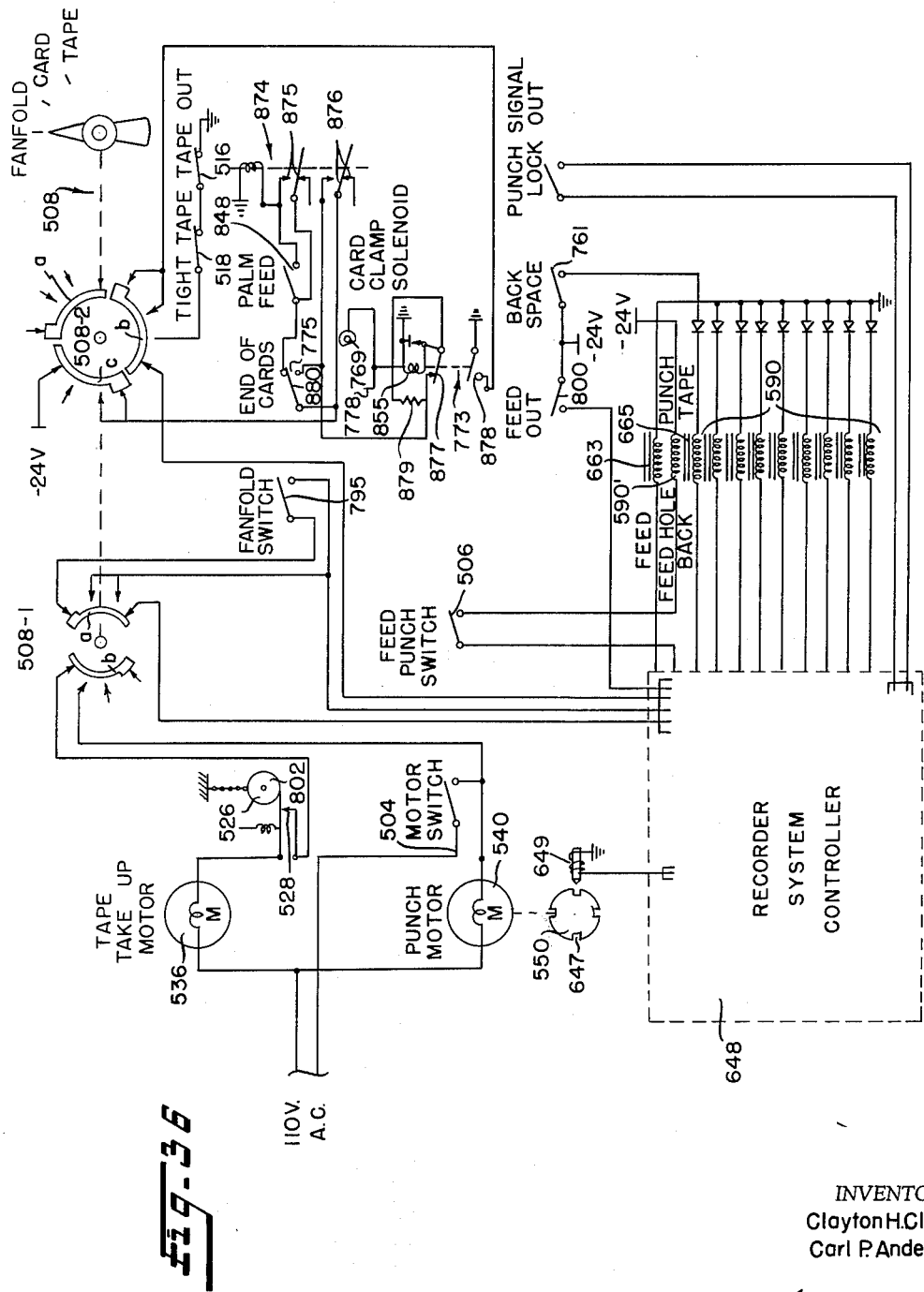

United States Patent Office 3,205,305
Patented Sept. 7, 1965

1

3,205,305
PLANETARY RECORDING APPARATUS
Clayton H. Clark, Mundelein, and Carl P. Anderson, Evanston, Ill., assignors to SCM Corporation, a corporation of New York
Filed Dec. 6, 1961, Ser. No. 157,540
22 Claims. (Cl. 178—34)

This invention pertains to recording apparatus with planetary operating mechanism enabling extremely high speeds of positive machine operation, the apparatus being embodied in various modifications enabling printing and/or punching of messages in readable form or coded condition on tape or other medium. The message may originate from data communicating systems such as telegraphic transmitters, calculators, business machines or other similar telegraphic media.

The basic mechanism of the several embodiments of the apparatus which are hereinafter described in accord with the present invention constitutes an epicyclic power transfer mechanism in which the cycloidal paths developed during planetating rotation of a plural number of members are used to obtain sharply defined, positive force transfer movements which result in recording operations. Each planetary member carries at least one operating unit, e.g., a typewheel, or a punch operating drum with numerous pins set in predetermined code-representative rows, or a punch group operating cam, or a combination of such operating units. Such units are conjointly rotated and planetated past one or more operating stations, i.e., points of selection or actuation position points where punching and/or printing may take place. As has been briefly noted, the apparatus may accomplish both printing and perforating, in which case the same or duplicate planetating components could provide the printing operation and the punching operation. Alternatively, the basic planetating mechanism may be used solely for printing purposes or solely for perforating purposes. Furthermore, the basic planetating mechanism can be used for both selection and operation or it may be used in conjunction with a separate code punch selecting assembly which furnishes the power necessary for actual mechanical selection of desired punches which is followed by a subsequent power application from the planetating mechanism to accomplish operation of selected punches and also sequential functioning of machine functions such as feed stepping of the record, normally necessary in recording devices.

The basic recorder mechanism can be used for printing and/or perforation recordations on various record media and to this end embodiments are hereinafter disclosed to illustrate a combination tape printer-perforator, several arrangements by which page printing can be accomplished and finally a complete reperforator unit capable of recording data in the manner of code perforations in different forms of record media such as tape, record cards and fanfold records. Of importance in the latter reperforator unit is its inherent ability, due to the rugged nature of the planetary mechanism, to accomplish punching of record feed holes in record cards and fanfold records which do not have pre-punched feed holes as well as in record tape. Furthermore, because it has become standard practice in the data processing field to use record cards and fanfold records with pre-punched feed holes for reasons discussed hereinafter, the complete perforator described hereinafter includes convenient controls to render its feed punch section automatically operative or inoperative as desired.

Very briefly, the recorder concept includes a planetary mechanism which in all instances provides the forces necessary for actual recording operations, printing or

2 punches, and the force is developed at outer peripheral peaks of cycloidal paths of movement of parts of planetating members. The paths are hypocycloidal if the planetating members are rotated within a ring gear and are epicycloidal if rotated about a sun gear. However, for convenience of standard terminology hereinafter, the paths will be referred to as hypocycloidal and the peaks will be referred to as hypocycloidal peaks. Selection is accomplished in two ways, both of which require relative repositioning between recording components and the planetating operating components. In one case, selection is accomplished by a shift of the angular cyclic phase positions of the repetitive cycloidal paths of data representative units on the planetating member so different hypocycloidal peaks occur at a specific operating position at the periphery of the planetary mechanism. This manner of selection rephasing the cycloidal paths can be accomplished by a selectively rotated, secondary input to the planetary mechanism. The second manner of selection is accomplished exterior of the planetary mechanism and includes plural operating mechanisms which can be selectively shifted into fixed hypocycloidal peak positions of the planetating members. Mechanisms for accomplishing selection in both ways will be fully described hereinafter.

Accordingly, a primary object of this invention resides in the provision of a novel recorder having a planetary operating mechanism, the recorder being capable of receiving code data and recording printed and/or punched code manifestations of that data with reliability and dependability while operating at high speeds.

Another object resides in the provision of a novel high speed recorder having selective recording components and a planetary operating mechanism which provides a momentary high speed positive force to operate the recording components, the selection of desired recordation being accomplished by mechanism which results in a relative shift between recording components and cycloidal paths of movement of planetating operating components.

In conjunction with the foregoing object, a further object of this invention resides in the provision of a novel selection mechanism which controls the phase position of the hypocycloidal peaks of planetating operating components, relative to an operating position by selective rotational positioning of a secondary rotary input to the planetary system.

Still another object resides in the provision in a recorder of a novel planetary assembly in which each of the planet members includes a print wheel with a plurality of different character types spaced about its periphery, each type following a distinct repetitive cycloidal path around the axis of the planetary system and having a different angular phase of its cycloidal path relative to each of the other types; and a selector mechanism which includes a secondary rotatable input to the planetary assembly having selective angular fixed positions at least equal in number to the plurality of types to enable selective rephasing of the cycloidal paths of the planetating types to thus cause any desired type to pass through a cycloidal peak at a predetermined operational recording position within the period required to accomplish a cycle of recording operation.

In conjunction with the preceding object, a further object resides in the novel provision, on the planet member, of a plurality of axially disposed rows of pins arranged to represent coded data information symbols and being moved past an operational recording position where each pin present in a row of pins can operate a specific recording component, such as a punch lever, or a function linkage, such as record feed mechanism.

In further conjunction with the immediately preceding object, a still further object resides in the novel provision of a planetary assembly with four planetating print wheels, each print wheel having seventeen circumferentially spaced apart peripheral positions, sixteen of which positions include type characters and one position being a neutral "blank" position, each corresponding position on all four typewheels passing through a common distinct and different plural peaked repetitive cycloidal path out of phase from similar cycloidal paths of each other position on all four typewheels as the planet carrier makes a complete revolution.

Still another object in conjunction with an apparatus using planet drums with rows of projecting operator pins, resides in the novel provision of a plurality of intermediate transfer levers arranged as a group at a specific operating position relative to the hypocycloidal paths of the planetating pins whereby a desired pattern of transfer levers are struck by cycloidal peaking position of a pattern of pins in a row of pins passing through a cycloidal path which has been selected by a phase shift so that the levers in turn activate different recording and function actuating components of the recorder.

A further object resides in the novel arrangement relative to a planetary operator assembly in a reperforator of the recording and function operating mechanisms operated by intermediate impact transfer levers in such a manner as to permit use of similarly shaped interchangeable transfer levers and to also permit interchangeability of identical code punches excepting for the feed hole punch which is of smaller diameter.

Another object resides in the provision of a novel high speed printer reperforator with a four type drum planetary operator utilizing a split code signal combination, one part of said code, through a planetary rotational coincidence detector, providing selection of a desired one of the four drums and the other part of said split code, through a plurality of selector solenoids, shifting a predetermined one of a group of code bars into such position as to cause a phase shift of the hypocycloidal path of movement of planetating type in the typedrums to result in activation of the different functions of the apparatus, such as printing, perforating and tape feeding.

Still another object resides in providing a novel planetary printwheel recorder having a plurality of printwheels journalled as planet components on a planet carrier rotatable coaxial relative to a sun gear, the printwheels being connected through gear drives to the sun gear whereby continuously repetitive epicyclic rotation patterns common to each printwheel are accomplished during carrier rotation and a solenoid operated code stop bar assembly operating in conjunction with a printwheel coincidence position detector is utilized to control the rotational positioning of the sun gear to thereby shift the phase of the epicyclic rotation of the planetating printwheels so any desired character on any one of the four printwheels can be caused to pass through a cycloidal peak in its path at a single specific operational position adjacent the planetary assembly.

A further object resides in the provision of a novel planetary type of selective punch perforator in which the force for operating all punches is derived from a hypocycloidal peak movement of a planetating cam member.

In conjunction with the preceding object, a further object resides in utilizing a plural number of novel planetating cam members and making each planetating cam member with dual cam edges to accomplish a plurality of hypocycloidal peak movements at spaced angular locations around the axis of the planetary assembly, the peaks occurring at different time periods during one revolution of the planetary assembly and thereby permitting rapid sequential punch operating and punch retracting movements to be accomplished with an operating stroke of substantial length due to a hypocycloidal peaking movement at a precise position on a substantially radial line within an extremely short increment of time.

Further novel features and other objects of this invention will become apparent from the following detailed description, discussion and the appended claims taken in conjunction with the accompanying drawings showing a preferred structure and embodiment, in which:

FIGURE 1 is a fragmentary perspective drawing illustrating a printing-perforating tape recorder embodiment of the present invention and shows mechanisms for accomplishing selection with subsequent printing, perforating and tape feed functions together with their relationship to one another;

FIGURE 2 is a detail perspective drawing illustrating the tape feed mechanism of the apparatus in FIGURE 1;

FIGURE 7 is a schematic drawing to depict a representative solenoid and the "Letters" and "Figures" solenoids, and the stop bar and all code bars being in neutral or stop position—all solenoids are de-energized;

FIGURE 8 is a schematic drawing depicting the "Letters" solenoid energized, the "Figures" solenoid de-energized, and the stop solenoid energized to thereby shift the stop bar to one of its release conditions;

FIGURE 9 is a schematic drawing depicting the "Figures" solenoid energized, the "Letters" solenoid de-energized, and again the stop solenoid is energized but in this situation the stop bar is shifted to the other of its release conditions;

FIGURE 10 is a schematic drawing depicting the stop solenoid de-energized during a "Letters" condition when the "Letters" solenoid is energized;

FIGURE 11 is a schematic drawing depicting the stop solenoid de-energized during a "'Figures" condition when the "Figures" solenoid is energized;

FIGURE 12 is a detail end view depicting the relationship of the code bars as well as the stop bar to the stop arms on the stop wheels;

FIGURE 13 is a schematic drawing depicting a "Letters" condition and a selected code bar solenoid energized;

FIGURE 14 is a schematic drawing depicting a "Figures" condition and a selected code bar solenoid energized;

FIGURE 15 is an enlarged partially sectioned view of the "Letters" and "Figures" solenoids and the stop solenoid, all shown in the neutral position (similar to FIGURE 7);

FIGURE 19 is a perspective view of a still further modified version of this invention designed to punch a tape, card or other record media, the figure being partially broken away to better illustrate details, particularly those of a tape take-up mechanism;

FIGURE 20 is a view showing fanfold paper (or cards) which may be used in the reperforator machine shown in FIGURE 19;

FIGURES 23 and 24 are partially sectioned elevation views of the punching mechanism of FIGURE 21, FIGURE 23 showing components in a non-punching position and FIGURE 24 illustrating the same components in a punching position, and both views illustrating the hypocycloidal paths of the cam edges;

Figure 31:
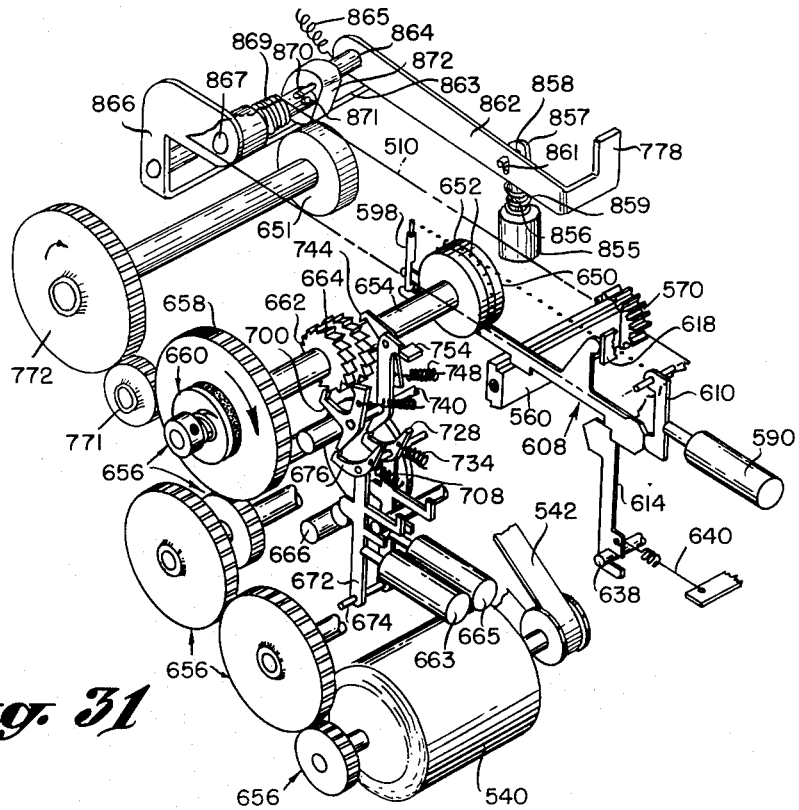
Figure 32:
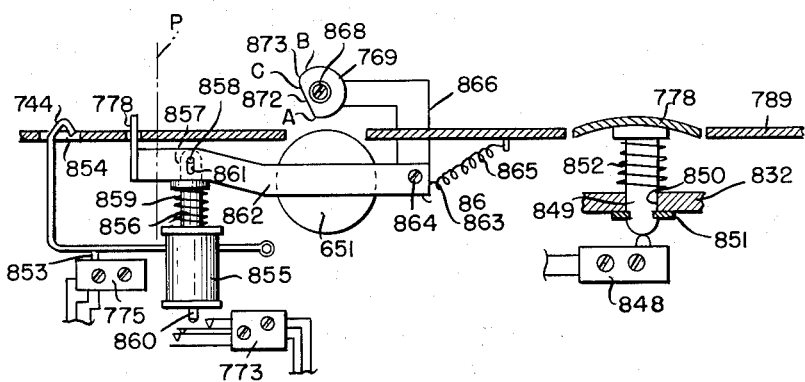
Figures 33, 34:
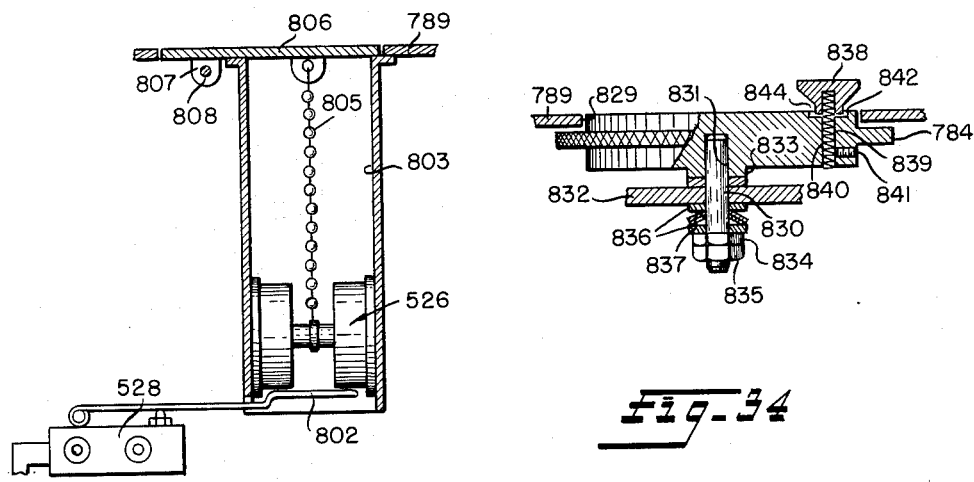
Figure 35:
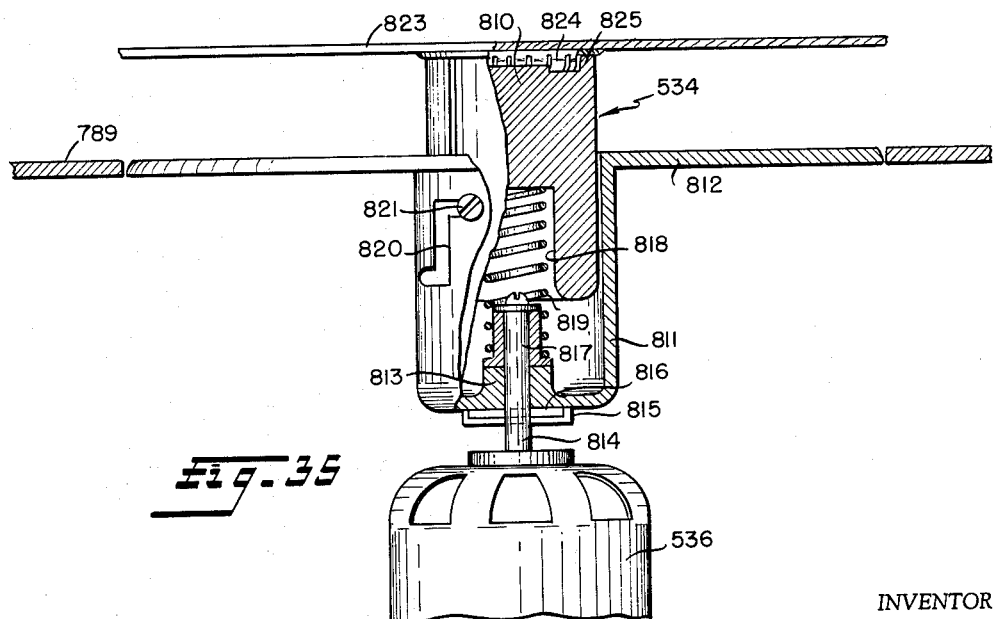

FIGURES 25, 26 and 27 illustrate the tape feed components for the punching mechanism of the FIGURE 19 modification: FIGURE 25 illustrating the rest or normal position with activating solenoid de-energized; FIGURE 26 showing the tape feed mechanism after the activating solenoid is energized and with the cocking lever in a cocked position; and FIGURE 27 showing the tape feed mechanism triggered and tape feeding operation completed;

FIGURES 28, 29 and 30 illustrate the tape back-space mechanism for the FIGURE 19 modification: FIGURE 28 illustrating the rest position with activating solenoid de-energized; FIGURE 29 showing the tape back-space mechanism with activating solenoid energized and the cocking lever in a cocked position; and FIGURE 30 showing the tape back-space mechanism triggered and tape back-spacing completed;

FIGURE 31 is a skeletonized perspective view showing the various punching and feed components illustrated in FIGURES 20–30 and their relationship to one another;

FIGURE 32 is a cross-section view of various card control components, e.g. end of card feeler, card stop, card clamping-pre-feed solenoid and palm plate;

FIGURE 33 is a detail section view of the weighted roller slack loop take control device;

FIGURE 34 is a section detail of one of the adjustable card guides;

FIGURE 35 is a section detail of the tape take-up reel and components; and

FIGURE 36 is a circuit diagram for the reperforator unit of FIGURE 19.

The following description discloses several embodiments of recording apparatus utilizing a planetary or epicyclic mechanism enabling high speed operation of various machine recording and function operating components. In some instances the planetary operation is utilized to accomplish recording in printed and perforated form, in other cases it is utilized solely for accomplishing printing operations and in other cases solely for accomplishing perforating operations. All embodiments, of course, are responsive to incoming code signal combinations which, through selector mechanisms, enable recordation in some form or manner upon a record medium either tape, paper or cards.

*Split code embodiment with selection by epicyclic phasing*

Figure 16:
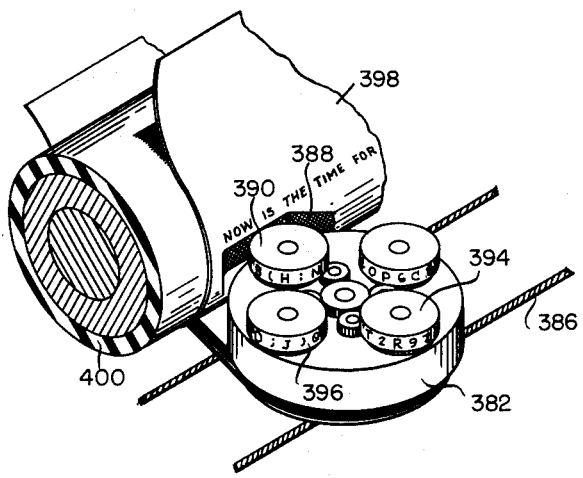
FIGURE 16 illustrates a variation of the mechanism of FIGURES 1–15 designed to print only as could be used on a typewriter or page printer.
Figure 17:
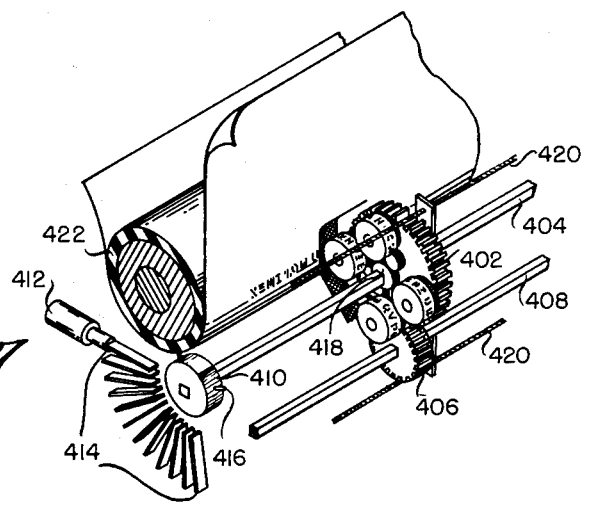
FIGURE 17 is a second variation of the mechanism of FIGURES 1–15 also designed to print only and schematically illustrates the selecting means and printing head.
Figure 18:
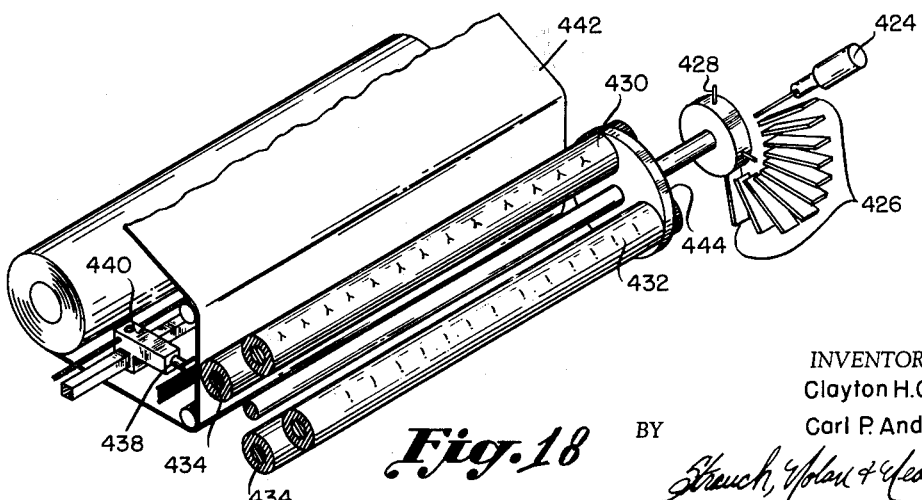
FIGURE 18 is a third page printing variation designed with the printing heads in roller form and a movable print hammer in back of the paper. Schematically shown is a selecting means coupled to the main shaft.

FIGURES 1 through 15 will be referred to in describing an embodiment whereby planetary mechanism is used to accomplish both printing and perforating or either of the two, upon receipt of code combination signal groups. FIGURES 16, 17 and 18 are three additional embodiments utilizing operational principles and mechanisms similar to those described with reference to FIGURES 1 through 15. In all of these first four embodiments the incoming code signal combination, which for illustrative purposes will be the five-unit Baudot code, is split into two sections, the first section containing two units of the code signal and the second section containing three units of the code signal. The first two code signal units render possible a one-out-of-four selection, while the latter three code signal units enable a one-out-of-eight selection.

In utilizing such a split code signal combination, one may use four printing and/or perforating wheels which taken together contain the total number of character representations desired. Any one of the four wheels can be selected by suitable mechanism and circuitry in response to an appropriate one-out-of-four signal. Furthermore, each one of the four typewheel and/or perforating wheels may include eight (or multiples of eight) different positions which contain character representation components, either a type member, or means for accomplishing perforation or both, in accord with the received signal. The eight different character representative elements can be individually selected for operation by an appropriate one-out-of-eight signal.

In addition to the noted eight representations on each of the wheels, there will be a ninth position on each of the four wheels which represents a normal or neutral position of all four wheels, which is the idling condition of the machine. Actually, the embodiment now to be described splits each of the eight positions into two positions, one corresponding to Letters and the other to Figures. In this manner each wheel can carry sixteen character representations plus the blank position making a total of seventeen positions. For all four wheels, this arrangement results in sixty-four operating positions and four (4) idle positions.

The basic nature of this split code group machine will be described with reference to FIGURES 1 and 3 to provide a general idea of the organization and its functioning after which a specific description of the mechanism illustrated in FIGURE 1 and its detailed operation will be provided.

The machine 50 illustrated in FIGURE 1 represents the mechanical components of a printer reperforator utilizing a tape as the record medium. Included with the mechanical components are five electronic induction heads 119, 120, 121, 122, and 123, a Letters selector solenoid 192, a Figures selector solenoid 194, eight selector solenoids 276, 278, 280, 282, 284, 286, 288, 290, and a neutral position "stop" solenoid 316 which will be later described in more detail. FIGURE 3 represents a logic digaram by which an incoming code signal group may be spread into two smaller groups of code signal units to obtain a one-out-of-four position signal and a one-out-of-eight position signal in addition to several of the function signals. The present invention does not involve details of the electronic circuitry control setup, therefore such details will not be herein described. However the system utilizes the specific control aspects of such a control mechanism and therefore the logic diagram of FIGURE 3 will be described in more detail hereinafter.

Operational power for machine 50 is derived from an electric motor 52 having a drive shaft 54, both ends of which extend from the motor. Non-rotatably secured to the end of drive shaft 54 nearest the viewer is a pulley 56 which can be made with single or multiple sheaves as desired. On the opposite end of shaft 54, a gear 58 is non-rotatably secured. Motor 52 thus provides two power input paths, one through pulley 56 and the other through gear 58, to a planetary assembly 60.

Figure 6:
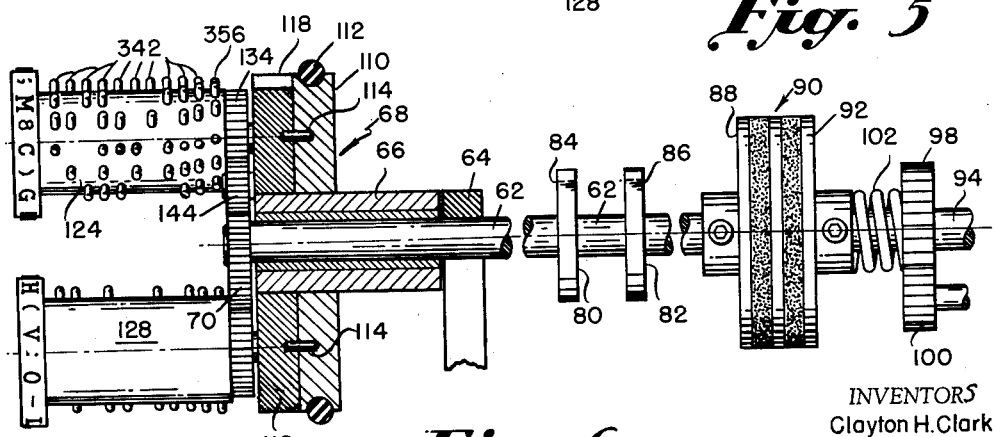
FIGURE 6 is a detail cross-section view illustrating the main shaft, the typewheel planetary assembly, two of the print wheel hubs with print wheels and some pins.

As seen in FIGURE 1, the planetary assembly includes print or typewheels and drums with radially projecting pins and it is through the medium of these components that printing and perforating is accomplished. Planetary assembly 60 includes a main shaft 62 (see FIGURE 6) which is suitably journalled in appropriate bearings such as the pillow block bearing 64. Main shaft 62 is rotatably journalled but axially fixed in its bearings 64 and, as shown in FIGURE 6, its left-hand end projects through and rotatably supports the hub 66 of a typewheel drum carrier 68. The projecting end of the shaft 62 has non-rotatably secured thereto a small gear 70 which is the sun gear of planetary assembly 60, the typewheel drum carrier 68 constituting the planetary carrier of the planetary assembly 60.

Shaft 62 also extends to the right and non-rotatably carries two stopwheels 80 and 82, each of which has a set of three radial stop arms 84 and 86, respectively, the arms in each set being spaced 120° apart. The angular position of stopwheel 82 on shaft 62 is offset slightly from the angular position of stopwheel 80 for reasons which become apparent. Stopwheel 80 will be designated as the Figures stopwheel, whereas stopwheel 82 will be designated as the Letters stopwheel.

Shaft 62 projects beyond the two stopwheels 80 and 82 and terminates in the driven disc 88 of a friction slip coupling 90. The driving disc 92 of the friction coupling 90 is non-rotatably but axially slidably secured to a driving shaft 94 which is mounted coaxial with main shaft 62 and suitably journalled as by pillow block bearing 96. Non-rotatably secured on the driving shaft 94 is a gear 98 which, through an idler gear 100 meshing with both the motor gear 58 and driving shaft gear 98, is drivingly rotated in the same direction as motor gear 58 whenever motor 52 is energized. The friction coupling 90 is biased into friction drive engagement by a compression spring 102 disposed between the driving disc 92 and driving gear 98 and whenever shaft 94 is being rotated by the motor 52, a rotational force is being applied to the friction coupling 90. In operation, if neither of the stopwheels 80 nor 82 is blocked, by means to be described, the main shaft 62 will be rotatably driven through the friction coupling 90 to thereby rotate the sun gear 70.

Typewheel carrier 68 includes a large pulley 110 secured on the hub 66 and disposed in planar alignment with the motor driven pulley 56. A pulley belt 112 drivingly interconnects the two pulleys 56 and 110. As seen in FIGURE 1, the typewheel carrier 68 and the sun gear 70 of the planetary assembly 60 are rotatable in the same direction.

Secured non-rotatably as by pins 114, to the front face of the large pulley 110 is a typewheel drum position selector and cycle indexing clock wheel 116 in the circumference of one edge of which is formed a slot 118, and in the circumference of the other edge are formed four slots 117 spaced 90° apart. The selector wheel 116 is formed of a magnetically conductive material, the slot 118 serving as a selector wheel position indicator when used in conjunction with the four induction heads 120, 121, 122, 123 spaced circumferentially at 90° increments around the selector wheel and slots 117 with induction head 119 providing cycle completion pulses. As the selector wheel 116 rotates past the induction heads 120–123, the slot 118, constituting a disruption in the magnetically conductive material of which the selector wheel is made, will cause a pulse in each respective inductive head repetitively providing four position indication signals representing four 90° positions of the typewheel carrier 68. These four positions are representative of four character representative typewheel drums 124, 126, 128 and 130 which are rotatably carried on fixed studs secured on parallel axes extending from the selector wheel 116 and radially spaced from its axis, each stud being equiangularly spaced 90° from adjacent studs.

Each of the four drums is essentially of cylindrical form carrying on its extended end a typewheel with certain character representative types while the main cylindrical portion includes a plurality of rows of pins which, as will be later described, are used for operating certain machine functions and perforator punches, sufficient for the time being to explain that there are a plurality of different sets of types and pin rows (sixteen) plus a seventeenth position, the neutral position, in which there is a blank space at the typewheel and no pins along the cylinder. The seventeenth position, which is the aforedescribed neutral position, occurs on all of the drums. At the base of each drum is located a small planet gear 134, 136, 138 and 140, respectively, which is non-rotatably secured to the respective drum to rotate the same. Associated in meshed engagement with each of the drum planet gears 134 through 140 are respective planetary idler gears 144, 146, 148 and 150, all of which are also enmeshed with the aforedescribed sun gear 70. All of these gears may be seen in FIGURE 4.

Figure 4:
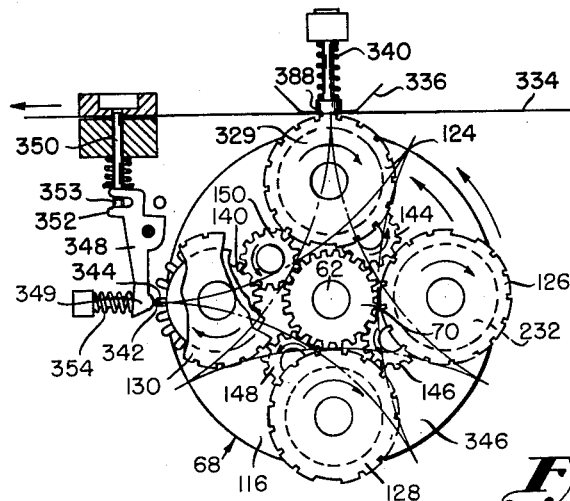
FIGURE 4 is an end view of the planetary print wheels, gearing and tape punching mechanism as used in the FIGURE 1 embodiment and also illustrates the cycloidal path of a specific peripheral location on the typewheel, e.g., a character which is being printed and of the pins which actuate the intermediate code punch levers.

Through precision timing and specific gear teeth arrangement, if the sun gear 70 is maintained in a specific position while the carrier 68 is being rotated, the same relative circumferential position of each of the drums 124, 126, 128 and 130 will always appear at a hypocycloidal peak opposite any specific chosen reference point, for example, a print position which in the illustrative embodiment is at top dead center. Accordingly, if the sun gear 70 is maintained in a fixed specific neutral position, representing no printing or idling, the gearing is so designed that a blank position on each typewheel rotates into top dead center position as that typewheel passes the top dead center of rotation of the planetary carrier 68. If perforating were to be accomplished by the pins which appear at the top dead center, then such pins would be located so that blank row (no pins) would appear at top dead center during a neutral rotation of the carrier, however the machine is so designed that punch operation is accomplished at a different peripheral position and accordingly the lines of perforator pins are so arranged that the blank row of all typewheels arrives at that position as each typewheel passes that position during the neutral or blank signal condition. For convenience (as shown in FIGURE 4) this offset pin operation position is placed 90° out of phase counterclockwise from the drum with the typewheel having that designated character. It is to be understood that the desired perforating rows could be located on any one of the four drums, the perforating mechanism being positioned accordingly.

The gear ratios have been selected so one complete relative rotation of the sun gear 70 with respect to the carrier will result in three complete rotations of all four of the planet drums on their respective axes, a 3:1 ratio between sun gear and planets. Each of the stopwheels 80 and 82 has three stop arms 120° apart, however one (1) or two (2) arms could be used.

The timing of the drive of the sun gear 70 relative to the drive of the carrier 68 is such that the sun gear can always rotate to and be stopped in a desired fixed position during the time period which elapses while selector wheel 116 is being rotated 90°. The sun gear angular position is therefore used to select a specific increment of cycloidal phase shift specifically required for the one of the four typewheel drums which carries the desired data character and the phase shift must occur while the desired one drum is being shifted the 90° preceding the operational recording position. Note, all of the four drums will undergo the same phase shift but since only one drum is the desired one, the phase shift must occur within a specific sector of carrier rotation. With the triple arm stopwheel, the sun gear could be permitted to rotate and be selectively stopped in any one of seventeen angular positions within each 120° of sun gear rotation. These seventeen positions correspond to the seventeen positions on each of the typewheel drums.

In the described seventeen position typewheel, one of the positions corresponds to blank and the other 16 are divided into two groups of eight each, one group being alternately interspersed between the eight positions of the other group. One of the stopwheels 82 is utilized to select the remaining eight positions which occur between every other one selected by the stopwheel 80.

To control the specific circumferential selective positioning of the main sun gear shaft 62, a group of eight selectively positionable code bars 292–306 and a stop bar 318 are mounted in a cage which disposes the bars circumferentially around an approximate 120° sector of rotation of the two stopwheels 80 and 82. By means of a distinct arrangement of the Letters shift solenoid 192 and the Figures shift solenoid 194, the eight selector solenoids 276–290 and the stop solenoid 316, appropriate ones of the code bars will be positioned in the path of a stop arm of either the Figures stopwheel 80 or the Letters stopwheel 82. This will be described in more detail hereinafter. The solenoids and code bars are so arranged so that all solenoids which coact with the code bars are de-energized when machine power is applied and when so de-energized the code bars will be located in a neutral position as seen in FIGURE 7. In this neutral position the ninth bar 318 which will be designated as the stop bar cooperates with the arms 84 of the Figures stopwheel 80 to render the main shaft 62 non-rotatable in a specific position where the sun gear 70 will control epicyclic rotation of all of the drums so that their typewheel blank positions come into a hypocycloidal peak at the operational position (top-dead-center) of the planetary carrier rotation.

Receipt of any code signal combination after energization of one or the other of the Letters or Figures solenoids will result in energization of one of eight code solenoids (FIGURES 13 or 14) resulting in removal of the neutral stop bar 318 and placement of a code bar 292–306 in position in front of the path of the stop arms 84 or 86 of one of the two stopwheels 80 or 82 resulting in an angular repositioning of the sun wheel which shifts the epicyclic phasing of the planetating drums so the desired character and corresponding pins move through hypocycloidal peaks at printing and/or perforating positions.

For reasons which will become apparent hereinafter, the first signal of an incoming message must be either a Letters or a Figures signal, whichever situation is desired. In accord with the control system disclosed, the machine will not begin printing until one or the other of such signals is received.

*Operational sequence*

Figure 3:
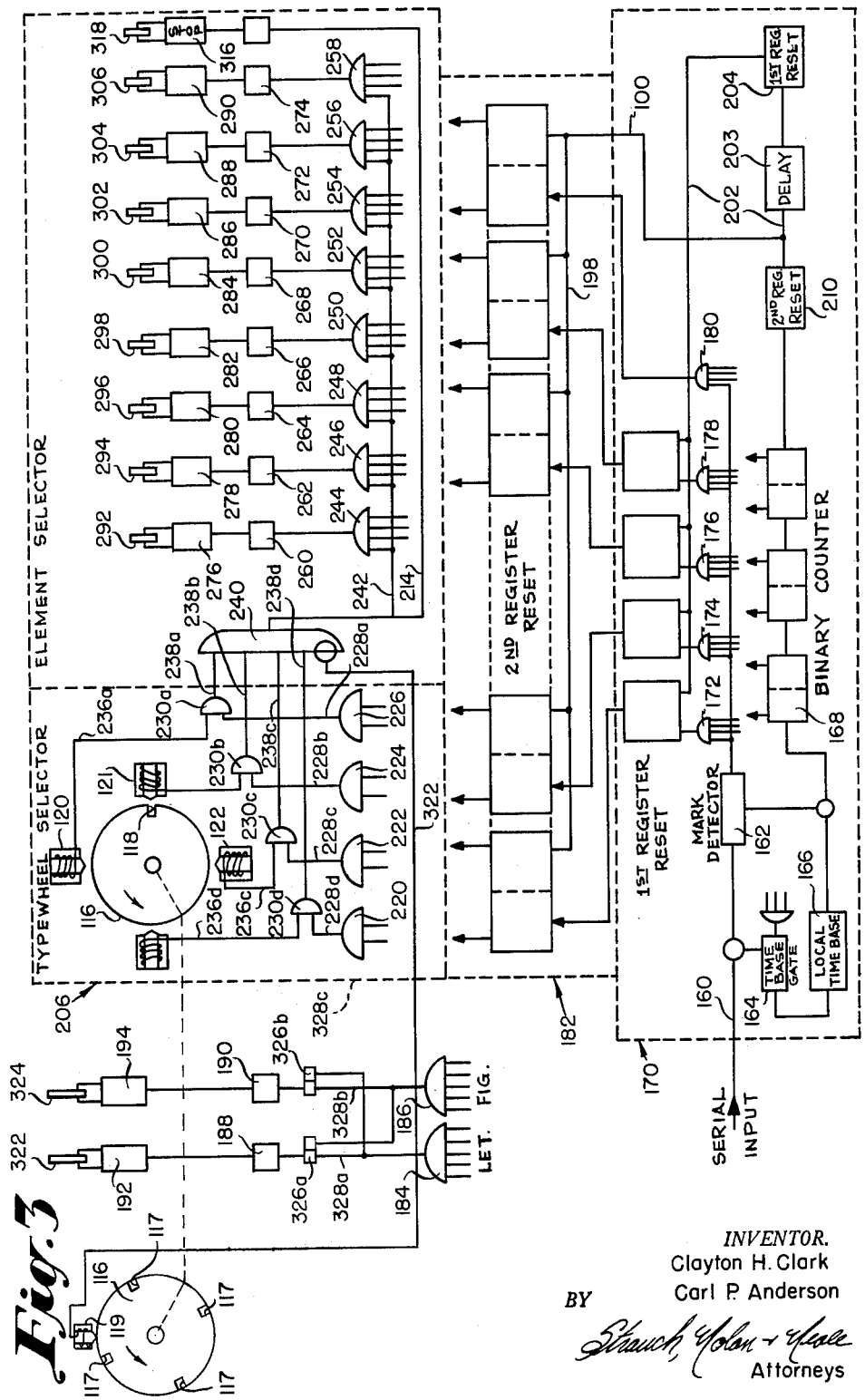
FIGURE 3 is a schematic drawing which constitutes a logic diagram of electronic circuitry which can be utilized with the embodiment shown in FIGURE 1.

Referring now to FIGURE 3, the code combination signal representing the Letters or Figures signal comes in on a signal input line 160 to the mechanism designated as a "mark" detector 162, simultaneously passing through a branch line to a time base gate 164, through a local time base device 166 and thence to a binary counter 168. In the binary counter 168 the various pulses of the code pulse combination being received are electronically sorted and presented in order to the gates of a first register 170, the pulses being presented in sequential order to gates 172, 174, 176, 178 and 180 until the last gate 180 is triggered which action clears the first register 170, presenting the code character pulses which have been set in the first register through appropriate lines to a corresponding second register 182. Used with a Baudot code system, the second register 182 will have five sets of two output lines, one of the two lines representing a mark condition and the other representing a space condition. Thus for every code combination received, one or the other of the two lines of each of the five sets of two will be conditioned to transfer an output pulse.

The five lines from the second register 182 which represent the code combination for "Letters" are connected to the five input lines of a Letters gate 184 and similarly the five lines which represent the code character combination for "Figures" are simultaneously connected to a Figures gate 186. When the code combination which has been received represents a Letters or a Figures signal, those pulses will be presented from the second register through the appropriate gate 184 or 186, a holding circuit and thence to a corresponding amplifier 188 and 190 which amplifies a signal and transmits it to the associated "Letters" solenoid 192 or "Figures" solenoid 194 which, as will be described hereinafter, readies the selecting mechanism (FIGURES 10 and 11) to be selectively set in accord with subsequent code character signal combinations received.

After the first register 170 is set and presents its information to the second register 182, the first register 170 will be reset and similarly when the second register 182 has presented its information to the electronic selector sections it also will be reset. The manner in which this resetting is accomplished will now be described.

Assuming that the Letters or Figures signal has been received, the next code character combination being received by the machine will come in on the serial input line 160 following the same pattern at first as did the aforedescribed Letters or Figures signal; passing into the mark detector 162, the time base gate 164, the local time base gate 166 and thence on to the binary counter 168. From the binary counter 168 the pulses are presented to the first register 172 and, when filling of that register is completed from the binary counter, the fifth pulse will trip the register 172 presenting the code combination signal pulses to the second register 182. When this occurs, a pulse results in line 198 from the second register. From line 198 the pulse passes through a branch line 200 which is connected into line 202 where it passes through a slight time delay device 203 to trip the first register reset 204. Tripping of the first register reset 204 resets the entire first register 170 readying it for the next incoming pulses from the binary counter 168.

In the meantime the second register 182 is presenting its information in two groups to a one-out-of-four typewheel selector assembly 206 (FIGURE 3) and a one-out-of-eight element selector assembly 208. As soon as the second register 182 has presented its information to the split selector assemblies 206 and 208, the next incoming code pulses passing into the binary counter 168 will pulse the second register reset 210 which resets the second register 182 readying it to again receive information from the first register 170.

In presenting its information to the two selector assemblies 206 and 208, the second register 182 presents pulses representing the first two code units to the typewheel selector assembly 206 and simultaneously presents pulses representing the final three code units to the element selector assembly 208. Each of the first two code unit pulses have two possible conditions and thus there are four permutated pulse arrangements (Mark-Mark, Mark-Space, Space-Mark, or Space-Space) which can be derived from the first two code units of the second register 182. This permutative arrangement determines which of the one of four pick-up coils is to be utilized for position detection of the selector wheel 116. Note that all of the pick-up coils 120, 121, 122 and 123 are sequentially and repetitiously pulsed as the selector wheel 116 completes each successive 360° revolution by reason of the slot 118 in the selector wheel passing the induction pick-up heads. These pulses pass through associated lines 236a–d into associated "and" gates 230a–d. Depending upon which of the four permutated arrangements of the two pulses representing the first two code units are presented from the first two outputs of the second register, one of four correlated gates 220, 222, 224 and 226 are opened to pass a pulse through to the gate output line 228a–d. The lines 228a–d are connected to second inputs of the associated and gates 230a–230d.

Bearing in mind that only one of the gate 220 through 226 will transmit a pulse from the first two code units of the second register, that associated one line 228a–d will pass the pulse only to one of the four and gates 230a–d and as selector wheel 116 rotates and sequentially transmits pulses through the four-pick-up heads 120 through 123, an appropriate one of the four and gates 230a–d will have both of its inputs pulsed thereby passing the selector wheel position pulse on through one of the lines 238a–d from which it enters an open inhibitor gate 240. From the inhibitor gate 240 the current pulse continues on through a line 242 from which it coacts with a specific permutated arrangement of the stored last three pulses from the second register 182.

Going back now to the code signal combination which was set up in the second register, it will be seen that the last three code units are each capable of one of two conditions and were presented as three simultaneous pulses from the second register to the element selector 208. The permutated arrangement in which they are presented (MSM, MMM, SSS, etc.) determines which one of eight and gates 244 through 258 is selected to be opened by the pulse which occurs on line 242. This permutative arrangement of the last three code signal unit pulses are stored in the selected one of and gates 244–258 until the pulse from the typewheel selector 206 passes through the inhibitor gate 240 into line 242 and triggers only that one selected and gate, for example, gate 244. Triggering of the selected and gate sends the pulse on to an amplifier 260 (there being 8 of such amplifiers 260–274) and from amplifier 260 the amplified pulse will energize a specific selector solenoid 276. Note, there are 8 of these selector solenoids 276 through 290 which are associated through the named amplifiers with the outputs of the 8 and gates 244 through 258. Energizing of a specific solenoid, e.g., solenoid 276 (see FIGURES 13 or 14) will force the selected code bar 292 which is one of the eight aforedescribed code bars 292–306, into the path of a stop arm 84 or 86 of one of the two stop wheels 80 or 82 depending upon whether the code is in Letters or Figures.

Simultaneously with the current pulse passing through line 242 to trigger the selected one of the eight and gates 244–258, a current pulse also passes into the branch line 314 to a separate stop bar solenoid 316 which is operated once during every code combination selection to simultaneosuly activate the special stop bar 318 each time any one of the selected code bars 292–306 is activated. FIGURES 8 and 9 illustrate this operation. Note, FIGURES 13 and 14 also show the stop bar 318 in release position which occurs simultaneously with selection of one of the code bars.

At times when no message is coming in on the line 160, it may still be desirable to have tape feeding operations. In such case, a blank pulse signal can be superimposed by known means on the input line 60 just as any other incoming signal and will go through the same channels up to the point where the code pulses are cleared from the outputs of second register 182. So long as the five units of the code combination presented from the second register 182 correspond to a blank signal, the one wheel which has the blank signal position for which there is a feed punch pin and a feed pin is selected and positioned repetitively, and this cyclic operation occurs so long as the blank pulse signal for feed is superimposed on the input line by a special feed circuit.

The Letters gate 184, the Figures gate 186 and the blank pulse gate 320 are interconnected by means of a holding and release circuit. As seen in FIGURE 3, this circuit may consist of bistable devices 326a and 326b. By means of this holding and release circuit, whenever a Letters signal opens the Letters gate 184 and pulses through amplifier 188 to the Letters solenoid 192, the circuit will be held by means of the bistable device 326a, however, should a Figures pulse open the Figures gate 186, a pulse will be transmitted to the bistable device 326a de-energizing the Letters solenoid 192. In a similar manner Figures solenoid 194 will be held energized by bistable device 326b after a Figures signal opens the Figures gate 186 until a Letters signal is received through the Letters gate 184 or the equipment is turned off.

Returning now to FIGURE 1, it is to be understood that the foregoing description of the electronic selector device enables the simultaneous epicyclic phase positioning of all four of the planetated typewheels 124, 126, 128 and 130 to any one of seventeen positions. Actually the typewheels are selectively set to one of sixteen character representative positions plus the blank position by only eight code bars and one stop bar because of the use of two separate stop wheels splitting the selected positions of the typewheels by 50%. Also the one of four detection in the selector mechanism provides a coincidence detector which controls when the epicylic pattern of movement of all four typewheels in phase shifted out of a normal or neutral pattern to the desired carrier rotational phase when one desired typewheel of the four typewheels is within the 90° sector preceding a printing and perforating position.

As seen in FIGURE 1, the code bar cage includes eight selectable code bars 292–306 and one neutral stop bar 318. The armatures of the Letters solenoid 192 and the Figures solenoid 194 each carry an associated bail 322 and 324 which overlies and engages all of the code bars. The Letters solenoid bail 322, represented diagrammatically in FIGURES 7–15 is disposed adjacent the upper ends of all of the code bars and the stop bar. In these diagrammatic figures, the neutral stop bar 318 is shown and in several of the figures one of the code bars 300 is illustrated.

Assuming now that the Letters signal has been received (see FIGURE 10) and a code character is being selected, with reference to FIGURES 8 and 13 we will see that a code bar 300 (FIGURE 13) has been moved into an interference position in the path of a stop arm 86 on the Letters stop wheel 82 and at the same time (FIGURE 8) the stop solenoid 316 has been energized to shift the stop bar 318 out of interference with the stop arm 84 on the Figures stop wheel 80. Before the code bar 300 was selected, the stop bar 318 was in interference position (see FIGURE 10) with one of the arms 84 of the Figures stop wheel 80, thus preventing the main shaft 62 from rotation and fixing the position of the sun gear 70 at one of its three neutral or "blank" positions which maintained the epicylical pattern of rotation of all four stop wheels in such condition to bring their blank elements into a hypocycloidal peak position at the operating locations or stations. Note, also that while the stop bar 318 is maintaining shaft 62 in a fixed "blank" position, the typewheel carrier 68 is being continuously rotating through power supplied by motor 52. Also the motor 52, through the gears 58, 100 and 98, is furnishing rotational power to the slip coupling 90. The instant that the code bar 300 was selected and the stop bar 318 shifted out of interference with its stop arm, the slip clutch 90 starts the main shaft 62 rotating, but rotation is almost immediately stopped when the selected code bar 300 is engaged by a stop arm 86 on the Letters stop wheel 82. During such short increment of rotation of the main shaft 62 the sun gear 70, fixed to the free end of shaft 62 meshed with the planetary idler gear 144, 146, 148 and 150 was rotated very briefly and then stopped. This brief rotation relocates the angular position of the sun gear 70 and through the precisely timed gear ratio rephases the epicylic pattern of the planetating drums which causes the character corresponding to that represented by the received code signal and appearing on the selected one of the four typewheels to arrive at a hypocycloidal peak as the planet carrier reaches the printing position 329 (FIGURES 1 and 4) at top-dead-center.

Printing occurs during the brief period when the selected print character passes through its hypocycloidal peak at printing position 329 and presses against the underside of a message tape 334 which in turn is pressed against an ink ribbon 336 located between the tape 334 and a back-up plunger or platen 338. The plunger or platen 338 is pressed against the ribbon 336 and held in such position by a light compression coil spring 340 which assures the platen of firm back-up pressure with a biased buffer action during each printing operation. By providing that the planet rotation is opposite to carrier rotation the rotational movement of the selected print unit relative to printing position 329 during printing is substantially nil.

It is noted that if the sun gear 70 were retained in this selected character position, a correspondingly located different character on the next typewheel which is being rotated by the carrier up to the printing position 329 would be printed. However, as soon as the printing operation has been accomplished, the selected code bar solenoid and the stop solenoid are both de-energized by a pulse from induction coil 119 to inhibit gate 240. This action instantly removes the code bar from interference position with the stop arm on the Letters stop wheel 82 and replaces the stop bar 318 into interference with the path of rotation of the arms of the Figures stop wheel 80 which relocates the sun gear 70 in the neutral position prior to the time that the next typewheel reaches printing position 329 and therefore the condition of the next typewheel at that point will be a blank condition and no printing or punching, which will now be described, will occur until a subsequent code signal is received.

Figure 5:
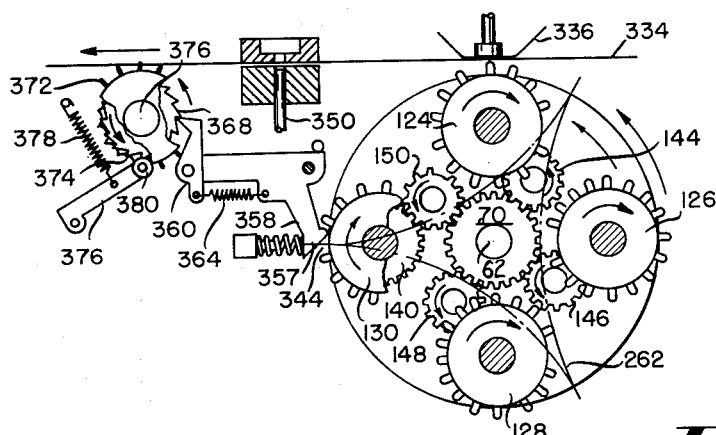
FIGURE 5 is an end view similar to FIGURE 4 with the print wheels deleted to illustrate the print wheel hubs with code pins and also the offset pins which are used to actuate the tape feed mechanism.

At the same instant that a selected character is being printed by the typewheel which was in the printing position 329, a line of pins which are set in the cylinder portion of the typewheel drum 130, 90° counterclockwise ahead of typewheel 124, and disposed in a manner representative of the selected character being printed on typewheel 124, arrives at a predetermined hypocycloidal peak position 344 located at a perforator operating position adjacent the planetary assembly and located 90° counterclockwise from the printing position 329. The drums with the rows of pins 342, during rotation of the carrier 68, are planetating and each set of pins describes a triple peaked hypocycloidal curve 346 as shown in FIGURES 4 and 5. Located at the punch operating position 342 of the pins are a group of intermediate levers 348, only one of which is shown in FIGURE 4, corresponding to the number of punches representing the received code signal. In the described example, the Baudot code signal being used has five punches together with a feed hole punch, thus there will be at least six pin positions in each row on the drums, a pin being present in each of the pin positions to represent punch operators as desired in accord with the selected character being printed and code perforated.

During a perforating operation the code and feed hole pins 342 which appear in the selected row well strike associated follower ends 349 of selected intermediate levers 348. These intermediate levers 348 are pivoted on a common axis and are interconnected with associated punches 350 through the medium of forked ends 352 which interlock with headed shanks 353 of associated punches. Those intermediate levers 348 for which pins 342 are present will be kicked clockwise against the force of bias springs 354, shifting the forked end 352 upward to thereby force the associated punches 350 upward and through the paper tape 334. As carrier 68 continues its rotation and the typewheel and pin cylinder drum 130 continues its epicyclic movement, the pins 342 are withdrawn in their hypocycloidal path and release the follower ends of the intermediate levers 248 permitting the springs 354 to return the intermediate levers 348 counterclockwise to their original positions, which action causes the forked ends 352 of the intermeidate levers to pull all punches 350 downward and out of the path of tape 334. Note that all pin row positions excepting the blank neutral positions on each of the four drums 124–130 include a pin representing the feed hole punch and therefore a feed hole will be punched for each code signal selection.

As seen in FIGURE 6, all rows excepting the neutral positions will have end pins 356 which are located at the right hand end of the row and are slightly angularly offset from the other pins in that row. Pin 356 is a tape feed pin and is intended to cause a tape feed step operation, by means of the mechanism illustrated in FIGURE 5, an instant subsequent to the punching actuation. Therefore, an instant after the punching operation described in conjunction with FIGURE 4, the tape feed operating pin 356 of the selected row of pins will engage the follower end 356 of a tape feed lever 358 causing that lever 358 to pivot clockwise on its pivot axis and shift a drive pawl 360 to index the tape 334 one step. Pawl 360 is pivotally carried on the end of feed lever 358 and biased by a spring 364 so its tooth end 366 is spring biased into constant engagement with a ratchet wheel 368. The ratchet wheel is non-rotatably secured on a tape feed shaft 307 rotatably mounted and disposed under the path of record tape 334. Attached to the opposite end of feed shaft 370 is a tape feed sprocket 372, the feed pins of which engage the punched feed holes in tape 334 and index the tape in steps each time the feed lever 358 is actuated. Also attached to the shaft 370 is a tape feed detent wheel 374 which cooperates with a detent lever 376 biased by spring 378 to urge the detent roller 380 into individual notches of the detent wheel 374 and assuring positive one step tape feeding and positioning.

The instant that a tape feed step operation is completed, the sun gear is repositioned to its blank position in the aforedescribed manner and almost instantaneously the next incoming code signal is presented from the second register 182 to the proper element selector assembly gates and the sequence of operation is repeated.

For descriptive purposes the five channel code has been used but it is to be understood that the machine is not so limited. For example, in a six channel code, the sixth bit could be used to indicate shift or no-shift for each signal combination and only one simple shift solenoid and circuit would be required.

*Page printer variations*

FIGURE 16 shows a second embodiment of the apparatus of FIGURES 1–15, used only to perform a printing operation. Basically it functions in the same manner as the embodiment just described insofar as printing is concerned, using similar selector means and principles. However, the planetary typewheel assembly 382 is mounted on a vertical axis and shifts horizontally on tracks (not shown), being stepped across a page and returned to a start-of-line position by cables 384 and 386, rolling the printed characters through a hypocycloidal peak against a ribbon 388 mounted between the typewheels 390, 392, 394 and 396 and a paper record medium, 398, or alternatively typing characters directly onto a sensitized paper, the record medium being rolled over a cylinder platen 400 such as used on a standard typewriter. A standard typewriter keyboard might also be employed in connection with the selector means.

FIGURE 17 shows a third embodiment similar to the mechanism in FIGURE 16 in that it accomplishes printing only. In this instance, the planetary typewheel assembly 402 is disposed on a horizontal axis and rotates on a bearing (not shown) which slides along square shaft 404. The planetary assembly is thus vertically mounted as in the principal embodiment of this invention (FIGURE 1). The square shaft 404 rotates through a friction drive (not shown) in a manner similar to shaft 62 of FIGURE 1 and the wheel carrier is rotated under power from gear 406 on a parallel shaft 408. A stop or selector wheel 410 is attached to the square shaft 404 and as a selector solenoid 412 (only one is shown) is energized it pushes the selected code bar 414 into the path of one of the pins 416, stopping a sun gear 418 which, through a precisely timed gear train causes a hypocycloidal peak of the desired character to arrive at the printing position at the desired exact moment. The main planetary assembly 402 shifts to the next print position by means of a cable rigging 420 which may be any of well-known means used to shift print wheel heads. Platen 422 is operated to line feed in the normal manner of a standard teletypewriter.

FIGURE 18 shows a fourth embodiment similar to both FIGURES 16 and 17 in that it prints only. Character selection is basically the same, also using selector solenoids 424 forcing code bars 426 into the path of selector wheel 428. However, in this version a plurality of rows of characters (each row containing a plurality of identical characters) are arranged on four rotating rollers 430, 432, 434 and 436 and as the character is selected, a moving hammer like platen 438 which is stepped behind a ribbon has its solenoid 440 energized to shift to a back-up position closely adjacent the ribbon and paper 442 when the selected character comes into position. In this application it is not required to restore the print rollers to a blank position after each printing operation. A planetary geared head assembly 444 is employed in the same manner that the typewheel hub 402 is employed in FIGURE 17 to select the proper character.

*Perforator modification*

A further selective perforator apparatus, constituting a modified version of the present invention is illustrated in FIGURES 20–31. This embodiment consists of a somewhat more compact and complete reperforator unit 500 equipped to receive coded data and punch correlated code holes in record media such as tape, cards or fan fold records. The machine is equipped with mechanism and controls which may be set to enable operation with record media having prepunched feed holes or it may operate with record media requiring feed holes to be punched by the machine 500. The epicyclic rotation in a planetary assembly, such as used in the previously described embodiments, is also used in machine 500, although in a slightly different manner. Herein, hypocycloidal peak movements of planetating components are utilized to impart operational power to selected punch mechanism, selection being accomplished by means not a direct part of the planetary system, as distinguished from selective hypocycloidal phasing in the previously described embodiments.

Generally speaking, the unit 500, as depicted in FIGURE 19, is a complete reperforator including power components, perforating assembly, feed means for various forms of record media and controls to enable a varied and versatile operation. FIGURE 19 primarily depicts the machine components, other than the punching and feeding mechanism, with the main control switches 504, 506 and 508 being grouped on a small panel 502 centrally located near the rear of the machine. Switch 504 is an "on-off" switch which must be turned "on" to start the machine. If feed hole punching is desired for any of the possible record media being used, switch 506, the feed hole punch control switch is turned "on." A three position record media switch 508 can be switched to either "tape," "cards" or "fanfold" position to condition the machine operation to accommodate the record medium to be used.

If the record medium is tape, the tape 510, which is pulled from a supply reel 512, passes around a vertical roller 514, through an end-of-tape switch station 516, around a tight tape switch operating roller 518 and under a first pressure roller 520. From roller 520, tape 510 passes through the perforating station where it is guided through a die block and guide located directly beneath a chad chute 522, thence under a second pressure roller 524. The tape then passes into a depending loop, the slack of which is taken up by a weighted roller 526 shiftable in a substantially vertical path above a tape take-up motor switch 528. The tape finally passes through tape guides 530 and 532 and is connected to a tape take-up reel 534 with its axis in vertical disposition and drive connected to a take-up reel drive motor 536. Tape path control circuitry utilizing the aforedescribed tape controlled switches may be any of many known constructions.

Assuming the machine is conditioned to perforate on a tape and made ready to receive coded messages as described in the preceding paragraph, perforating and feed function will thereafter occur in accord with received code information. Upon the punch motor switch 504 being turned on, the punch motor 540 (FIGURE 21) starts rotating and, through a belt 542, rotates a cam carrier assembly 544 of punch cam planetary mechanism 546.

The planetary mechanism cam carrier assembly 544 has two spaced end discs 548 and 550 non-rotatably coaxially secured on a shaft 552 which has non-rotatably secured to one of its ends, a pulley 554 rotated by means of the motor driven belt 542. Carrier assembly 544 is suitably journalled for rotation in bearings such as 556 mounted in the machine support framework. Rotatably journalled on axes located eccentric but parallel to shaft 552 and at 90° spaced apart positions between carrier discs 548 and 550 are four elongate double faced cams 560, 562, 564 and 566. Each of the cams 560–566 are non-rotatably fixed on an associated shaft 568, stub ends of which are disposed in suitable bearings (not shown) in the end discs. Adjacent one end of each cam, an associated gear 570, 572, 574 and 576 is non-rotatably secured to a respective shaft so that each set of shaft, cam and gear can rotate about its respective shaft axis as a unit and all four sets will be rotated by the carrier assembly about the axis of the carrier shaft 552.

Located adjacent one end of the carrier assembly 544, surrounding and meshed with the four gears 570–576 is a fixed stationary ring gear 578 which, in the illustrated embodiment, has three times the number of teeth present in each planetary cam gear. With a 3:1 gear ratio, the hypocycloidal path of one of the cam edges of each of the dual cams 560, 562, 564 and 566 will follow the repetitive path 580 indicated by phantom lines in FIGURE 23, passing through three equiangularly spaced hypocycloidal peak positions during one revolution of the carrier assembly 544. The opposite cam edge of each of the dual cams follows a similar hypocycloidal path 582 offset 60° from the first path 580 and thus also passes through three equiangularly spaced hypocycloidal peak positions which occur intermediate the three hypocycloidal peak positions of the opposite cam edges. Thus, the two cam edges of each of the four cams pass six circumferentially spaced peripherally located peak positions during one revolution of the carrier and these positions can be used as operating positions. Only two diametrically opposite operating positions of the six positions (see FIGURE 23) are occupied by cam edges of only two opposed cams at any specific period which means three distinct sequentially time spaced and angularly spaced camming operations can be accomplished during a 60° increment of rotation of the carrier assembly 544. Note that the cams rotate about their axes in a direction opposite to the direction of rotation of the carrier assembly so the movement of the cam edge as it passes through one of the hypocycloidal operating peaks is substantially radial with little or no component of rotational movement about the carrier axis.

FIGURES 23 and 24 show that two of the six cam operating positions X and Y are utilized for certain of the punch operations. The two positions are chosen to assure that they do not occur simultaneously, in other words, one cam edge of cam 560 will move into position X at a time when no cam edge is at position Y, then the opposite cam edge of the following cam 566 moves into operating position Y 30° of carrier rotation after the preceding cam edge was at position X. Because there are four cams, this sequence is repeated once during each ninety degrees of carrier rotation, and four complete cycles of punch operation can be accomplished during each revolution of the carrier. An important aspect of the planetary arrangement is that four punch operational cycles can be accomplished during a complete rotation of the cam carrier and at the same time the length of the operating stroke of the cam is not sacrificed even though it occurs during an extremely short angular increment of carrier rotation because the stroke occurs when the cam edge follows the peak of its hypocycloidal path which results in a substantially immediate movement and removal of the cam edge to and from operational interference. This rapid and precisely positioned application of force permits high-speed opposed direct and positive punching and retracting operations through a common linkage as will be presently described.

Returning temporarily to FIGURE 21, a group of solenoids 590 are shown positioned at one side of the planetary cam system. There is a solenoid corresponding to each of the feed and code punches and the code solenoids are connected to appropriate receiver circuitry so various ones are simultaneously energized upon receipt of a code signal combination. The feed hole punch solenoid 590' (FIGURE 36) is connected in the control system circuitry in such manner that it will be energized each time a code signal group is received, so long as the aforedescribed feed hole punch switch 506 has been placed in the "on" position. If the feed hole punch switch is in its "off" position (used whenever the record medium has been pre-punched), the feed hole punch solenoid cannot be energized and there will be no subsequent actuation of the feed hole punch. Operation of any of the punches of the multiple punch perforator 500 is occasioned by momentary energization of the solenoid 590 corresponding to the desired punch. Accordingly, the punching mechanism and its operation will be described with reference to FIGURES 21, 23 and 24 for only one punch.

Punch mechanism and operation

Figure 21:
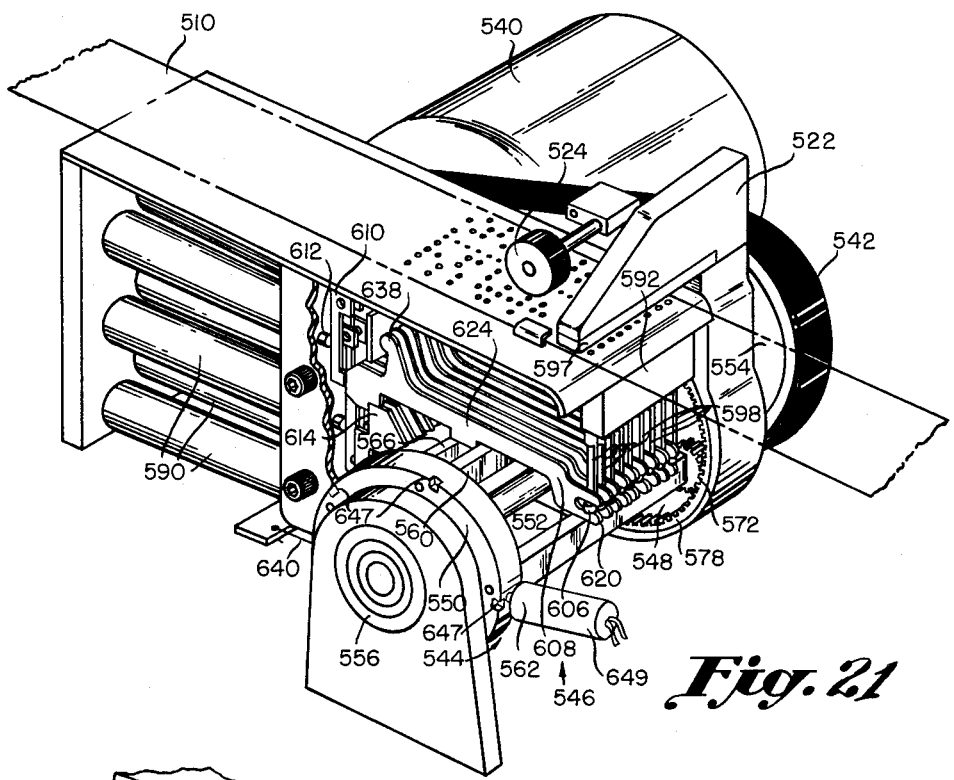
FIGURE 21 is a perspective detail view showing the compact arrangement of multiple punches, punch levers, selector solenoids, planetating mechanism and drive motor as utilized in the machine of FIGURE 19.
Figure 22:
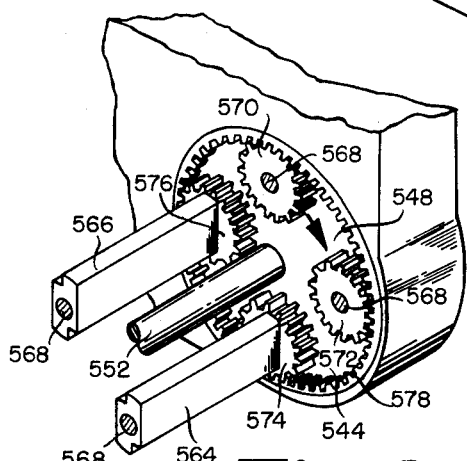
FIGURE 22 is a detail perspective view illustrating two of the four cams, the ring gear and planetary gears used in the punching machine shown in FIGURE 20.

Shown in FIGURE 21, a group of punches, nine including the feed hole punch are reciprocally mounted in alignment in a punch guide 592 rigidly secured to the machine frame. Above the punch guide is the tape guide and die assembly 594 (FIGURE 23), the lower guide plate 596 of which is coplanar with the flat table top of machine 500 forming the record medium track, and the chad removal tube 522 abuts over the chad exit portion of upper die plate 597.

More clearly shown in FIGURE 23, each of the punches 598 have a heavy shank 600 and a punch ends 602, the shanks 600 being guided for vertical sliding movement in the punch guide 592 and the punch ends 602 being guided in the lower die plate 596. Although the perforating components and planetary cam operators are sufficiently rugged and powerful to operate all punches simultaneously, if desired, the individual punches could be operated in rapid sequence. One way to accomplish this relationship would be for the punch set to have the punch ends ground at an angle canted from a plane normal to the punch axes so all punches will be of slightly different lengths. A similar punch set is fully described in copending United States application Serial No. 547,265, filed November 16, 1955, now Patent No. 3,009,988, and results in minute increments of sequential punch initiation of a group of selectable, simultaneously shifted punches regardless of which punches are selected to reduce the high operating forces which would occur if all punches initiate penetration of the record medium at the same instant. Another way to accomplish the same effect would be to provide a slight inclination along the edges of the cams which operate the punches.

The shank ends 600 of each punch 598 are provided with a side recess 604 which provides a lateral lug 606 at the lower end of each punch. Associated with each punch 598 is a set of operating linkages including a punch lever 608, an intermediate lever 610, a plunger 612 of an associated solenoid 590 and a retracting lever 614. The plurality of punch levers 608, associated intermediate levers 610 and retracting levers 614 are mounted as an assembly in a suitable cage (not shown) with combs (not shown) to maintain each associated set of levers in coplanar paths. Punch levers 608 are permitted a lateral reciprocating motion between two stop plates 616 and 618, rigidly fixed to machine support structure, and a vertical motion with the levers pivoting about the lower edge of stop plate 618 as a fulcrum.

The right-hand end of punch lever 608 has two elongated fingers 620 and 622 forming a fork which embraces the end lug 606 of the associated punch, the fork fingers being of sufficient length to enable a slight lateral reciprocation of punch lever 608 relative to the punch lug. At an intermediate location on the lower edge of each punch lever 608 is an anvil lug 624 which, in the non-selected normal (or retract) position of punch lever 608, is disposed just to the left of the planetary cam hypocycloidal peak operating position X, at which position the anvil will not interfere with the hypocycloidal path of the edges of the planetating cams. An arm 626 projects from the upper edge of punch lever 608 and terminates in a curved abutment end 628 located adjacent the left-hand stop plate 618 and is utilized during a retract operation as will be hereinafter described. The extreme left end 630 of punch lever 608 in an abutment head aligned in the path of a cooperative abutment head 632 at the free end of an associated intermediate lever 610 pivotally mounted at its other end on a pivot shaft 634 which is disposed normal to the punch levers. The intermediate levers are of different lengths to accommodate the different locations of the solenoids 590 within the assembly of solenoids. With such an arrangement, energization of a selected associated solenoid 590 moves the solenoid plunger 612 to the right, pivoting the intermediate lever 610 counterclockwise to abut and shift the punch lever 608 to the right of its operative position as determined by abutment of the fork fingers 620, 622 with plate 616 (see FIGURE 24). In its selected operative position, punch lever anvil 624 will be now disposed in the hypocycloidal peak path of a cam edge a short distance below the upper limit of peak point X and as the next cam edge passes through point X, punching actuation will occur, as will be described.

The retracting levers 614 are pivoted at their lower ends 636 on a common pivot pin 638 with radial comb slots maintained on its pivot position of pin 638 by a spring 640. The upper ends of the retracting levers include an anvil impact head 642 and a notched portion 644 which is interlocked with a complementary notched portion 644 on the associated punch lever 608. The normal position of the retracting lever anvil head 642 (FIGURE 23) is out of the path of a planetating cam (one shown in phantom lines) as it passes the operational position Y. However, when an energized solenoid 590 has shifted its punch lever 608 to the right (FIGURE 24), the interlocking notches 644 and 646 of levers 608 and 614 will force the associated retracting lever 614 clockwise about its pivot to place the retract anvil head portion 642 into the hypocycloidal peak path of the planetating cams at operational position Y.

The slotted end connection 636 of each retracting lever 614 being biased onto the pivot shaft 638 by spring 640 aids in ease of assembly and provides an impact absorbing connection preventing the forces resulting from impact blows on anvil portion 642 from creating a high moment couple about the pivot shaft 638. However, if desired, a straight pivot pin could be used with spacers and the retracting levers could have ordinary pivot apertures.

Indexing is provided by using one of the planetary assembly end discs 550 as a clock with four slots 647, 90° apart and an induction coil head 649. Impulses are generated in coil 649 each time the planetary cam assembly 544 passes a position where a selection is permitted by the angular location of the four cams.

Punch operation

Upon receipt of the incoming code signal group from a controlling source 648 (FIGURE 35) as permitted by an index pulse from head 649, code punch selecting solenoids 590 corresponding to the code signal group are simultaneously energized (see FIGURE 24). The solenoids 590 vary in number depending on the number of punches 598 or code units being used (for instance, the 5 unit Baudot code or 8 unit data processing code). When a solenoid 590 is energized, its plunger 612 moves out and pushes the associated intermediate lever 610 and it, in turn, pushes the end 630 of associated punch lever 608 instantly moving the punch lever 608 to the right, positioning punch lever anvil 624 into an interference condition with a punch cam 560, 562, 564 or 566 determined by the forked end of the punch lever striking stop bar 616.

The punch motor switch 504 being turned to its "on" position, the planetary cam system 546 will be operating so the gears 570, 572, 574 and 576 on the ends of each dual punch cam 560–566 which mesh with fixed ring gear 578 cause portions of each of the punch cams to pass through a hypocycloidal path.

FIGURE 23 shows one cam edge of cam 560 missing the anvil 624 of a non-selected punch lever 608. However, if punch lever 608 has been selected and shifted to the right by its energized solenoid 590 (see FIGURE 24), then as cam 560 comes around to the operating position X its cam edge strikes the anvil 624 of punch lever 608, moving the punch lever 608 counterclockwise instantly about the lower fulcrum edge of stop plate 618 and punch lever fork finger 620 interlocked with lower lug 606 of associated punch 598 causes the punch to move upward in punch guide 592, and force its end 600 through tape 510 and up into the punch die 597 to thereby punch the proper code hole 650 (see FIGURE 21). If tape feed punch switch 506 is "on" a tape feed hole is simultaneously punched in the manner just described.

An instant later, 30° of carrier rotation, the opposite cam edge of the next cam 566 strikes the anvil 642 of retracting lever 614 which shifts the lever about the pivot pin 638 and, being interlocked with punch lever 608, imparts a rapid movement of the punch lever 608 to the left to its normal non-selected and inoperative position. During the leftward movement of lever 608, projection 626 on the top edge of the punch lever 608 is moved to the left until its end abutment 628 strikes the stop plate 618, whereupon it becomes a punch lever fulcrum, and causes the punch lever 608 to pivot in a clockwise manner around the end abutment 628, moving the forked lever end clockwise so upper fork finger 622 positively pulls the punch 598 downward and out of the tape. An instant later the tape feed mechanism, now to be described, is operated through a feed step cycle.

*Feed mechanism and operation*

Primary feed and back spacing of the record medium, whether it be tape, cards or fanfold, is accomplished by means of an indexed rotatable sprocket feed roller 650, as seen in FIGURE 31, located below the record media track and positioned just after the punching station. A preliminary indexed feed wheel 651 as will be hereinafter described, is also used in the card and fanfold modes of operation. A plurality of feed pins 652, secured in the periphery of feed roller 650 engage properly spaced feed holes in the record medium so that stepped rotation of roller 650 causes a stepped feed movement of the record medium. The distance of each step movement of the feed roll moves the tape a distance equal to the spacing between adjacent feed pins so that feed holes punched between each feed step are properly spaced. Pre-punched feed holes must, of course, be spaced to fit the stepped feed movement. Similarly, stepped back-spacing movement of the feed roller 650 will back-space the record medium.

The mechanisms by which stepped feed and stepped back-spacing are accomplished are inter-related and are illustrated in FIGURES 25–31. All of these figures appear as viewed from the rear of the machine 500. The sprocket feed roller 650 is non-rotatably secured on the end of a shaft 654 which is suitably journalled for rotation in the machine support structure. Rotational power is supplied to feed shaft 654 from the punch motor 540 through a stepped down gear transmission 656 to the input member 658 (a gear) of a friction slip coupling 660, the output of which is drive connected to the feed shaft 654.

Also non-rotatably secured on feed shaft 654 are two ratchet toothed wheels 662 and 664. Wheel 662 serves as an escapement wheel which provides motor powered, escapement stepped rotation of feed sprocket 650 through the friction slip coupling 660. Ratchet wheel 664 serves as a pawl driven wheel, the operation of which is against the rotational force transmitted through the slip coupling 660 to rotate the feed sprocket in a reverse direction.

The organizational relationship of the stepped feed escapement mechanism and the back-spacing mechanism is shown in the skeletonized perspective FIGURE 31 which also illustrates the location of one set (the feed punch set) of the punch operating linkages. The feed escapement mechanism will be described with reference to FIGURES 25–27 and FIGURES 28–30 will be used in describing the back space mechanism. Both mechanisms are cocked by associated individually energized solenoids 663 and 665 and both mechanisms are mechanically triggered by camming action of a roller 666, four of which are carried on and eccentric to the axis of a roller wheel 668. Roller wheel 668 is rotated by means of one of the intermediate gears in train 656, at a speed at least approximately three times the rotational speed of the planetary carrier assembly 544 to assure that one of the four rollers 666 passes an operational camming position during each 30° of rotation of the carrier assembly thereby assuring that a feed escapement step can be accomplished during the time period when the planetary cam carrier assembly 546 rotates the 60° which is provided between a punch retraction operation and the next succeeding punch operation.

The feed escapement mechanism consists of the feed solenoid 663, its plunger 670, a cocking lever 672 which is in the path of and is pivoted to a latched cocked position by movement of plunger 670 when the feed solenoid is momentarily energized. Cocking lever 672 is pivoted at its lower end on a fixed pivot pin 674 and at its upper end pivotally carries a double armed latching lever 676. The right-hand edge of cocking lever 672 has two spaced apart fingers 678 and 680 embracing a horizontal guide post 682 and absorbing a major portion of the shock of impact of a roller 666 against a cam projection 684 on the left-hand edge of the cocking lever 672, which projection 684 is moved into the path of rotation of the rollers when the lever is cocked. The upper finger 680 terminates in a hook lug 686 which engages the head 688 of a position limit screw to determine the cocked limit position of the cocking lever 672.

A double toothed escapement lever 690 is pivoted on a pivot pin 692 fixed in the machine frame, so its two escapement teeth 694 and 696 can be rocked alternately into and out of engagement with the peripheral teeth of escapement wheel 662. The lever 690 is biased clockwise by a spring 698 so its lower tooth 694 normally engages a tooth of wheel 662, and blocks rotation of the escapement wheel. Escapement lever 690 includes a depending arm 700 which terminates in a bent latching lug 702. This lug, in normal position of the escapement linkage, is positioned immediately above a latch hook 704 on one arm of the latching lever 676. The latching lever 676 is biased in a clockwise direction by a spring 708 so its other arm 706 abuts the end of a position limit adjustment screw 710. Through the articulation connection of the latching lever 676 and the cocking lever 672, which pivotally carries the lever 676, the force of spring 708 tends to pivot the lever 676 counterclockwise about its abutment with screw 710 and also urges lever 672 to its retracted position which maintains the hook end 704 of latch lever 676 spaced just below the latch lug 702 of the escapement lever 690.

*Tape feed operation.*—As has been previously described, tape feed occurs immediately after retraction of the punch levers and punches, at which instant the controlling unit 648 by a one shot signal pulse causes the tape feed solenoid 663 to be momentarily energized, whereby plunger 670 presses against the tape feed cocking lever 672 moving it counterclockwise (see FIGURE 26) and forcing cam projection 684 into the rotating path of a roller 666 on roller wheel 668. The wheel 668, when power is "on," rotates continuously in a counterclockwise direction. As tape feed cocking lever 672 pivots counterclockwise toward cocked position, it shifts the latching lever 676, attached to its upper end, in a counterclockwise direction, which moves the lever arm 706 from abutment with limit screw 710. As hook end 704 of latch lever 676 moves past the latch lug 702 of escapement lever 690, the latching lever 676 can now pivot clockwise, urged by its spring 708 into a position in which latching lever 676 and escapement lever 690 become latched. Bearing in mind that the solenoid 662 is no longer energized, the moment after this latching occurs, one of the rollers 666 will strike the cam projection 684 on the tape feed cocking lever 672, instantly and positively pivoting the tape feed cocking lever 444 clockwise to its retract position. This retract movement, in turn, moves latching lever 676 in a clockwise direction. Due to its being latched with escapement lever 690, the initial retraction movement of latching lever 676 will positively pivot the escapement lever 690 counterclockwise to disengage the lower tooth 694 from blocking engagement with a tooth of tape feed escapement wheel 662 on the feed shaft 654.

Because the feed shaft 654 with the tape feed sprocket 650 is friction coupled through slip clutch 660 (FIGURE 31) to motor 540, the feed shaft 654 will instantly start to rotate when the lower tooth 694 of escapement lever 690 is disengaged from the tape feed escapement ratchet 662. However, the shaft 654 will stop rotating almost instantly because clockwise movement of the latching lever 676 which disengages lower escapement tooth 694 causes upper escapement tooth 696 to engage a tooth and block further rotation of the tape feed escapement ratchet wheel 662. Continued shifting of the latching lever 676 clockwise by pivoting of cocking lever 672 causes its upper arm 706 to abut the limit stop screw 710 which cams the hook end 704 of lever 676 away from latched engagement and permits escapement lever 690 to pivot clockwise, disengaging upper tooth 696 and re-engaging the lower escapement lever tooth 694 with the tape feed escapement ratchet 662, at which stage the tape feed wheel has been indexed one step.

It should be noted that the two engaged teeth on the tape feed ratchet wheel 662 are each indexed one-half a tooth space during each operation of the escapement, and therefore the total rotation of the tape feed sprocket 650 is one feed step. The pins 652 in the tape feed sprocket 650 engage the tape 510 through tape feed holes 712 and in this manner, the tape 510 is indexed after each printing operation.

*Back-spacing.*—The mechanism for back-spacing will be described with primary reference to FIGURES 28, 29 and 30 which clearly illustrate that the back spacing mechanism utilizes a solenoid 665, a plunger 720, a cocking lever 722 pivoted on shaft 674 and having guide fingers 724 and 725 and a cam abutment projection 726, and the cocking lever 722 pivotally carries at its upper end a latching lever 728 which has a hooked end 730 and an upper arm 732 biased by a spring 734 and abutting an adjustable screw limit stop 736. The foregoing back-spacing components are substantially identical to the corresponding feed mechanism components. As with the escapement cocking lever 672, the two fingers 724 and 725 on the back-space cocking lever 722 embrace the guide post 682 and the upper finger 725 has an end hook which engages behind the head of a screw adjustment member 738 to limit the cocked position of lever 722.

Pivotally mounted on pivot post 692 is an intermediate transfer lever 740 having a depending arm terminating in a bent latching lug 742 which normally is disposed just above the latch lever hook 730. The upper arm of intermediate lever 740 pivotally carries a back-space spur lever 744 having a depending combined abutment and spring anchor arm 746 and a lateral arm terminating in a spur 750. A tension spring 748 attached between fixed structure and the spur lever anchor arm 746 biases the spur lever arm 746 to a normal inoperative position against the end of an adjustable positioned limit screw 752 and the bias force of spring 748 also urges the intermediate lever 740 clockwise to its normal inoperative position where its upper end 753 engages a position stop plate 754. In the normal inoperative position of the back-space mechanism, the spur 750 is in alignment with but spaced away from engagement with the back-space ratchet wheel 764 secured to the feed shaft 654.

*Back-space operation.*—When back-spacing is desired or becomes necessary, a back-space key 760 (FIGURE 19) located on a central panel on the top of machine 500, is pressed, it being understood that motor 540 is energized and rotating. Back tape solenoid 665 (FIGURES 28–30) is instantly energized, by means of switch 761 (FIGURE 36), and its plunger 720 will strike the back-space cocking lever 722 moving it counterclockwise (FIGURE 29) until finger hook 725 catches on limit stop screw 738. This forces cam projection 726 on the back-space cocking lever 722 into the path of a roller 666 on roller wheel 668.

During the counterclockwise cocking movement of back-space cocking lever 722 the latching lever 728 is shifted until its latch end 730 latches in front of the latch lug 742 of the intermediate transfer lever 740. Almost instantly, a roller 666 strikes the cam projection 726 kicking the back-space cocking lever 722 clockwise and it, in turn carries the latching lever 504 with it back to normal position. However, since the latch hook 740 of latching lever 728 is latched with latch lug 742 on the lower end of the intermediate transfer lever 740, it pivots the intermediate transfer lever 740 in a counterclockwise direction. This movement shifts the back tape spur lever 744, located at the top end of the intermediate transfer lever counterclockwise and also permits it to pivot counterclockwise until spur 750 meshes with the teeth of the back space ratchet 664, the spur lever 744 being urged to pivot counterclockwise on its own pivot by spring 748. As shown in FIGURE 30, this movement of the spur lever 744 shifts the spur 750 into engagement with a tooth on ratchet wheel 664 and also rotates the back-space ratchet wheel 664 counterclockwise one tooth space, indexing the tape 510 back one step.

During back-space indexing the escapement lever 690 coacting with the escapement ratchet wheel 662 provides the detent action to retain the feed shaft in back-spacing position.

Continued pivotal movement of the back-space cocking lever 722 clockwise to its normal position (after being so propelled when roller 666 struck cam projection 726), and because the end of upper arm 732 of the latching lever 728 rides against adjustment screw 738 because it is so biased by spring 734, will cause latching lever 728 to rotate counterclockwise, releasing latch lever hook 730 from engagement with the lower end lug 742 of the intermediate transfer lever 740. Instantaneously, the intermediate transfer lever 740 will snap in clockwise rotation under the bias of spring 748 until it hits stop 754 and at the same time the lower arm 746 of the back spur lever 744, riding on adjustment screw 752, must cause lever 744 to rotate clockwise to retract the spur end 750 away from engagement with the back space ratchet wheel 664. This sequence of events is repeated until the back-space solenoid is de-energized by releasing back-space key 760.

Returning now to FIGURE 19, there is shown a back tape scale 762 which is used in conjunction with the back-space mechanism. This scale 762 is to be used by the operator to denote the number of spaces to be back-spaced and is utilized by marking the tape 510 as indicated at 764, with a pencil at "0" denoted at 766 on scale 762. After marking the tape the operator will operate the back-space key 760 and, merely by watching the mark 764 which he has made on the tape 510, can determine how many spaces the tape has moved backward by watching the position of the mark 764 as it moves along the scale 762. When the proper number of back-spaces have been accomplished, key 760 is released.

Upon completion of a back-spacing operation the operator can then press a delete key on his keyboard (not shown) thereby indicating, as by a specific punched code, deletion of the incorrect code holes, and normal operation may then be resumed.

During operation of the machine a chad box (not shown) inside the main machine housing will, in time, become filled and when this occurs, a signal light 768 (FIGURE 19) will flash on. The chad box of course should then be emptied. A dry form of lubricant specifically molybdenum disulfide, applied by spraying or dipping, on the interior of the inlet of chad tube 522 above die plate 597 will assure freedom of passage of the chad through the tube. This dry lubricant prevents blocking of the chad tube which results in malfunctions of the equipment when the chad is generated at ultra-high speeds.

As described with reference to FIGURE 19, the three position switch 508 can be set on "tape," "cards" or "fanfold" although the machine has been described herein as using tape. It is well-known in the data processing field, that when single cards or fanfold records are to be used in a data processing perforator or reperforator machine they are often supplied with pre-punched feed holes. In such cases, operation of the feed hole punch is not desired. The mechanism by which punch selection and retraction is accomplished permits taking the feed hole punch out of operation merely by opening the control circuit to the feed hole punch solenoid which is done by turning the feed hole punch switch 506 to the "off" position.

On the other hand, record cards or fanfold records which are not pre-punched with feed holes can be used in the present machine, and when used, all punches including the feed hole punch are permitted to operate in the normal manner, the positive acting rugged punch linkage and feed apparatus of this machine being completely capable of punching and accurately locating feed holes as well as the code holes in all records and cards as well as in tape. An important advantage of this feature is that the exhorbitant expense of pre-punched record media can be eliminated.

The feature of punching feed holes in the cards and fanfold records is provided by the use of the aforedescribed preliminary feed wheel 651 (see FIGURE 31) and a shiftable clamping D-wheel 769 (FIGURES 19, 31, 32 and 36), the mechanism and operation of which will be hereinafter described. Feed wheel 651 has a cylindrical smooth surface. The surface is not polished, one example having a phosphated finish. As clearly depicted in FIGURE 31, the pre-feed wheel 651 is located on the infeed side of the punch station and is securely fixed on a rotatable shaft 770 parallel with the feed sprocket shaft 654. The two feed shafts 654 and 770 are directly rotatably connected through the slip coupling gear 658, an idler 771 and a gear 772 on the end of shaft 770. The gear ratio is such that the peripheral speed of the pre-feed wheel 651 is exactly the same as the peripheral speed at outer circumference of the body of feed sprocket 650. Thus if the D-wheel 769 is shifted down and clamps a card or other record against pre-feed wheel 651, subsequent feed stepping of the primary feed sprocket 650, as has been described will step feed the card or record into the punch station and up to and in engagement with the sprocket feed wheel 650 which then can assume positive step feeding engagement with the feed holes in the record.

In punching single cards, three position switch 508 is set on "card" position, and a card 766 (shown in phantom lines in FIGURE 19) is inserted into the machine from the right until the card edge abuts a retractable card stop 778. Two undercut short posts serve as card guides 780 and 782 which can be set to the appropriate width of the card 776 by rotating attached knurled wheels 784 and 786. As soon as the adjustments for cards being used have been made, a light downward pressure on the card 776 by the operator will depress a card feed plate 788 which will be covered by the positioned card. By means of electromechanical linkage (to be described) the aforedescribed D-wheel 769 is brought down until it firmly clamps card 776 against pre-feed wheel 651 and mechanical linkage will retract the card stop 778 below the top surface of the machine table 789. Retraction of card stop 778 below the table surface actuates a switch 773 which energizes a circuit to the machine controller 648 (FIGURE 36) and permits normal punching operation under control of the system controller to proceed in the manner hereinbefore described. When punching of the card is completed, an end of card feeler 774 will raise up, actuate an end of card switch 775, the card stop 778 will then raise up and its switch 773 will open to deactivate the machine.

When fanfold records are used, the three position switch 508 is set on "fanfold" position and the first fanfold record unit 790 is fed into the machine with all punches conditioned to operate normally unless fed holes are pre-punched. Fanfold card 790 is inserted into the machine until a special pre-punched hole 792 slips over the operating button 794 of a fanfold sensing switch 795 which, when tripped, permits the normal punching operations to be initiated. The first fanfold card is not used for a record because its torn input edge is not a sufficiently accurate locator. The first card of the fanfold strip can therefore be random punched or fed through the machine. Upon completion of filling the first fanfold card 790, the control system will be operated to actuate the feed mechanism so the next card 796 is automatically pulled into a position where its special pre-punched hole 798 aligns with the fanfold sensing switch operating button 794. The pattern of operation will be repeated and continues so long as each card is completely filled to a predetermined condition by punching operations. In the event that a card is *not* completely filled, the machine will automatically stop upon completion of the last punched character. The operator must then press a tape feed out key 799 which, through switch 800, will automatically feed the fanfold card until the next special pre-punched hole 792 is aligned with the fanfold sensing switch button 794 whereupon tripping of the fanfold sensing switch 795 will again cause the machine to resume data punching operations.

*Record tape mechanism*

Returning temporarily to the tape mode of operation of the reperforator 500 several of the tape feed components will now be described with reference to FIGURES 19, 33, 35 and 36.

As readily apparent from FIGURE 19 and as seen in the circuit diagram of FIGURE 36, if the tape 510 breaks or the end of the supply is reached, the tape-out or end-of-tape switch 516 will open and also if the tape 510 becomes caught and tightens the tight-tape switch 518 will open. Assuming that mode selection switch 508 is placed in the tape mode, the two switches 516 and 518 will be in a series control circuit through mode switch bank 508-2, segment *b*, to the controller 648 which will be rendered inoperative to send control code signals to the reperforator if either the tape-out switch 516 or tight tape switch 518 is opened.

The reperforator punch motor switch 504 is merely an on-off switch in series with the power circuit from punch motor 540 to the A.C. power source and is not controlled by the mode selector switch 508 or the controller 648.

On the other hand, the tape take-up motor 536 derives its source of power through a circuit connected to the A.C. power and including tape slack switch 528 in series with switching contacts in mode switch bank 508–1, bridged by segment f in the tape position only of switch 508. Thus positioning of mode switch 508 in card or fanfold position will open the power circuit to tape take-up motor 536 and render it inoperative.

The other switch 528 in series with the mode switch 508 in the power circuit for the tape take-up motor 536 is an on-off switch spring biased to the "off" position. Depicted somewhat pictorially in FIGURE 19 and in elevation in FIGURE 33, switch 528 has an extended flag type operator 802 projected to a position under the aforedescribed weighted roller 526. Roller 526 is shaped in the manner of a spool and is guided in a vertical chute 803 which is fixed to and depends from the lower surface of the machine table 789. An opening 804 in the table 789 above the chute enables a slack loop in tape 510 to pass down one side of the chute, under roller 526 and up the other side of the chute from whence it passes around the guides 530, 532 and onto the take-up reel 534. A loose chain such as the ball chain 805 is rotatably fastened to a center axle portion of the weighted roller 526 and attached to the underside of a chute lid 806, pivotally fastened by ears 807 and a rod 808 to the underside of table 789 so the lid 806 will lay flush with the table top when in closed position. The chain 805 enables the weighted roller 526 to be raised and placed over a tape 510 to form the desired slack loop.

The tape slack loop will gradually lengthen under the force of roller 526 as tape is punched and feeds from the punching station until the roller presses the flag 802 downward to close the switch 528 and energize the tape take-up motor 536 which immediately starts to rotate the reel 534 and wind up the tape slack shortening the loop, raising the roller 526 and turning off the switch 528 to de-energize the take-up motor 536. In this manner there will always be a slack length loop of tape held only by the relatively light weight of roller 526 to permit back-spacing of the tape 510 without danger of tearing the feed holes if back-spacing had to pull the tape against the mass of the reel 534 and motor 536.

The take-up reel 534, as seen in FIGURE 35, is made with a depressible center post 810 fitting coaxially within a center cup portion 811 of the reel turntable 812. Turntable 812 has a hub 813 which fits over the shaft 814 of take-up motor 536 with a drive groove 815 in hub 813 interlocking over a cross pin 816 in motor shaft 814. A spring guide bushing 817 within the turntable cup portion 811 fits over a projected end of motor shaft 814 and a screw and washer secured in shaft 814 securely fastens the turntable to the motor. In such assembled position, the upper surface of the turntable 812 is flush with the top of the machine table 789.

Center post 810 has a blind bore 818 in its lower end receiving a coil compression spring 819 seated on the aforedescribed bushing 817, the spring creating a light bias force tending to project the center post 810 upward and projecting out of the turntable cup portion 811. The extent of movement of the center post 810 into and out of the cup portion is limited by three Z-slots 820 (one being shown) in the side wall of the cup portion which provide guide paths and upper and lower locking slots for shouldered screws 821 fastened through the Z-slots into the body of center post 810. A slight twist of the center post 810 will unlatch it from an operative extended position whereupon a pressure downwardly and a further slight twist will latch the post in a depressed position where its top end will be flush with the machine table 789 as is desired whenever the mode of machine operation is for record cards or fanfold.

The side surface of the upper end of center post 810 is provided with several axial slots 822 to receive the leading end of a tape record.

Ease of removal of a roll of record tape from reel 534 was a primary purpose for developing the depressible center post. An operator merely has to place his thumb on the center post, depress it and grasp the roll of record tape between his thumb and forefinger, thereby effectively eliminating the danger of spilling a roll of tape.

A final rather simple but operationally important aspect of the tape take-up reel 534 is the provision of a snap-on reel cover 823. Cover 823 has secured coaxially on its underneath side a large circular spring fingered snap fastener 824 which can be pressed into an axial annular flange 825 formed by a recess in the projected end of the center post 810. The cover is a safety precaution because the reperforator 500 may be installed in a drawer of a machine desk and, should the take-up roll of tape record start to "cone" outside of the drawer, it could be spilled, torn and ruined by opening the drawer. The cover 823 very simply prevents any degree of coning of the record tape roll.

*Record card and fanfold mechanism*

In the foregoing description of record card operation, brief reference was made to the adjustable card guides 780 and 782. Both guides are identical and are used to engage one edge and guide either the cards or a fanfold record strip in a straight path through the punching station. In so doing, the guides also create a light downward pressure on the record to prevent any tendency for the records to lift up and away from the guides. Because both guides are identical, only guide 780 will be described in detail with reference to FIGURE 34.

The main guide body 828 is a flat disc with an annular radial flange constituting the knurled operating portion wheel 784 projecting through a side wall slot and clearly seen in FIGURE 19. The upper surface of guide body 828 is disposed flush with and within a circular cutout 829 in the top of the machine table 789. A stud 830 is tightly press fit in a bore 831 in the underside of the guide body 828 and passes through a hole in the machine frame 832 to support and rotatably journal the guide 780. The body 828 has a shallow boss 833 resting against a washer placed over stud 830 and on the frame support 832. Stud 830 carries two nuts 834 and 835 which lock and hold flat washers 836 and spring washers 837 in a compression fit against the underside of frame support 832. The compressed spring washers provide the necessary friction fit which holds the rotational position of the guide body 828 to any adjusted position.

Each guide body has an eccentrically positioned guide button 838 projected upwardly and carried on the end of a small close wound spring coil 839. Coil 839 projects into a bore 840 in guide body 828 and is secured with a set screw 841. The upper end of bore 840 terminates in a recess 842 somewhat deeper than the thickness of a record card. A blind bore 843 in the under-side of button 838 enables the button to be pressed, with a twist in the direction of the coils, over the end of coil spring 839 until a bottom cylindrical portion 844, also slightly deeper than the thickness of a record card but substantially smaller in diameter than the recess 842 fits with side clearances down into the recess 842. The bottom of button 838 may or may not touch the base of recess 842 but preferably it does not quite touch thereby permitting a slight oscillatable flexing movement. When the guide 780 is adjusted to move the frusto-conical surface 845 of the button 838 against the edge of a record card, the card is thus urged snug against the table top as its edge passes under the frusto-conical surface 845 and abuts the cylindrical surface 844 and the slight flexing of coil stud 839 places a small bias force against the record card holding the engaged edge down and urging the record card snug against a back guide plate (not shown). The disclosed button shape will not bind the guided edge of the record card.

Preliminary feed mechanism

As was previously described, when this machine 500 is in the card or fanfold mode of operation, as determined by mode switch 508, the first fanfold record or a card is inserted (FIGURE 19) until it abuts the card stop 778. A palm plate 788 is then operated, resulting in a machine operation which brings the pre-feed D-wheel 769 down and clamps a record card against pre-feed wheel 651, simultaneously withdrawing the card stop 778 and permitting perforator operation to commence. FIGURES 31 and 32 illustrate the mechanism for accomplishing such action and FIGURE 36 shows suitable circuitry.

Referring to FIGURE 36, placing of the mode switch 508 in either a card or fanfold position will set up a circuit, through the mode switch bank 508–2, segment c, to a —24 volt potential, controlled by the two-position end-of-card switch 755 and the open-close palm switch 848.

Shown in FIGURE 32, the palm switch plate 788 has an arcuate contour which raises it slightly above the surface of table 789. Plate 788 has a depending stud 849 guided for vertical movement in an aperture 850 in the machine frame 832. A clip 851 on the lower end of stud 849 limits upward movement of plate 788 and a light compression coil spring 852 biases the plate upwardly. Palm switch 848 is mounted directly under the plate stud 849 so that pressure on palm plate 788 will actuate the switch 848 to a closed position. The end-of-card switch 775 is mounted under the table 789 and is shown at the left of FIGURE 32, its operating pin 853 being lightly biased upwardly with just sufficient force to support the end-of-card feeler wire 774 in a raised position so it projects through a hole 854 in the table adjacent the feed sprocket. End-of-card switch 775 is normally biased to the position shown in FIGURE 36 and is actuated to its other position solely by the weight of a card or fanfold record on the curved end of the feeler wire 774.

Seen in FIGURE 32 is a solenoid 855 which will be referred to as the card clamping solenoid. The solenoid plunger 856 projects upwardly, terminating in a fork fitting 857 with a cross pin 858, being biased upwardly by coil spring 859. The lower end 860 of the solenoid plunger projects from the bottom of the solenoid and serves as the actuator for the aforedescribed clamping switch 773.

Plunger cross pin 858 projects through a vertical slot slot 861 in a horizontal lever arm 862, the bent end of which terminates in the aforedescribed, upwardly disposed card 778. Lever arm 862 extends from one side of a U-bracket 863 which is pivotally mounted on a fixed rod 864 and provides an anchor for one end of a tension spring 865 which biases the U-bracket and its lever arm 862 counterclockwise (FIGURE 32), i.e., against the upward bias of the solenoid spring 859. The solenoid spring 859, exerts a force which overpowers spring 865 and thus the cross pin 858 engages the upper end of slot 861 in the lever arm 862 to normally maintain the card stop 778 projected above the surface of table 789 (see FIGURES 19 and 32).

On the other side of U-bracket 863, an L-shaped lever arm 866, extends upward to a position above the table and then horizontally to a location above the pre-feed wheel shaft 770 (see FIGURE 31). Best shown in FIGURE 31 is a horizontal stud 867 rigidly secured in the end of the L-lever 866 and projecting parallel to and above the axis of the pre-feed wheel 651. Journalled on a reduced end of the horizontal stud 867 is the aforedescribed card clamping D-wheel 769, held axially in position on the stud, directly vertically above pre-feed wheel 651, by suitable means such as a retaining screw 868 in the end of stud 867.

The D-wheel 769 is depicted in FIGURES 31 and 32 in its normal, disengaged position in which it is biased under the biasing force of a light torsion spring 869 on the stud so that a horizontal pin 870 is fixed in the rear face of D-wheel 769 is abutted to a limit position against a lug 871 fixed in stud 867. As seen from the rear, in FIGURE 31, the D-wheel is biased in a clockwise direction (as seen from the the front, in FIGURE 32, it is biased in a counter-clockwise direction) by the torsion spring.

With specific reference now to FIGURE 32, it will be seen that the periphery of D-wheel 769, from location A to location B, is cylindrical and should occupy approximately ¾ of the circumference. Substantially all of the remaining periphery of the D-wheel is a flat surface 872. The intersection between the flat surface 872 and the cylindrical portion results in an intentional rather sharp line at A which, in the normal disengaged and biased position of the D-wheel is disposed a slightly spaced distance above the cylindrical surface of the pre-feed wheel 651 to permit free passage of a record card. The other intersection of the flat surface 872 is faired in a smooth curve 873 between points C and B for a purpose to be described. Note, line P in FIGURE 32 is the center line of the punches.

When clamping solenoid 855 is energized, by circuitry as will be described, the plunger 856 is pulled downward and together with the bias force of the bracket spring 865 causes the card stop 778 to drop below the table surface. The same force and action simultaneously lowers the D-wheel 769 to clamp a record card against the pre-feed wheel 651. The energized limit position of solenoid plunger 856 is adjusted to place the cross pin 858 in abutment at the bottom end of lever slot 861 when the D-wheel is in clamping engagement with a record card and, at such limit position, the lower plunger end 860 has actuated the clamping solenoid switch 773.

With the D-wheel lowered to clamping position, and the card stop withdrawn the reperforator can be operated by the system controller 648 and each cyclically indexed feed step will cause the pre-feed wheel 651 to rotate an incremental angular step. The record card will be moved past the punch station P in precise feed steps under control of the pre-feed wheel and D-wheel 769 which is tightly clamped against the record card. The D-wheel will be rotated an equivalent angular increment against the light torsion bias of its spring 869 by rolling action as the card moves.

During feed indexing of a record, under control of the pre-feed wheel 651, the punches (assuming the record is not pre-punched) will be punching accurately located and spaced feed holes in the record. If feed holes are already pre-punched, the feed punch actuation will be deleted by opening the aforedescribed switch 206. In either situation the record is stepped by the pre-feed mechanism for each punching cycle until its first feed hole is located in position to be engaged by a pin in the primary feed sprocket 650. The feed holes will be in proper coincidence position because the card stop 778 assured that the first feed hole of pre-punched records and the first hole punched into blank records was so located that subsequent indexed stepping of the record is exactly correlated with sprocket feed pin index steps. It will be recalled that peripheral movement of the primary feed sprocket 650 and of the pre-feed wheel 651 are in a 1:1 ratio.

When the record has been stepped a sufficient distance so the feed sprocket pin 652 engage the feed holes, D-wheel 769 has rotated into an angular position placing the flat surface 872 adjacent the record where it can no longer tightly clamp against the record card. Pre-feed stepping by pre-feed wheel 651 will then terminate, even though the pre-feed wheel 651 continues its stepped rotation. At the termination of pre-feed the D-wheel 769 undergoes a slight drop permitted because the flat surface 872 is adjacent the record card and the slot 861 in lever 862 permits such a movement of the entire bracket 863 under the bias force of spring 865 and beyond the clamp action of the solenoid. The D-wheel as seen in FIGURE 32 can not rotate in a feed direction counterclockwise beyond the point where the flat surface 872 is at its lower horizontal disposition, because the D-wheel stop pin 870 (FIGURE 31) will have rotated to abut the other side of stop lug 871. On the other hand, the flat surface 872 now serves as a pressure foot biased only by spring 865 against the record card which slides under the D-wheel as it feeds on through the machine.

The purpose of the faired curve 873, between points B and C on the out feed side of the D-wheel flat surface 872, is to assure that the D-wheel will not regrip the record and start a reverse rotation during any back-spacing of the record. Such action is not desired because, if the D-wheel were to be reversely rotated while clamping a record, its rotation would very quickly be blocked when its limit pin 871 abutted the stop lug 871 and the record would jam or be torn as the feed sprocket 650 continued to index backwards.

Referring to the circuit diagram of FIGURE 36 it will be seen that when a single record card or a fanfold record is placed in start position against the card stop 778, the various switches 508, 775, 848 are in the illustrated positions. The operator will momentarily close the palm switch 848, energizing the grounded coil of an intermediate relay 874 by means of a circuit through one side of the end-of-card switch 775 thence to mode switch bank 508-2, segment c, to a negative 24 volt potential. As soon as relay 874 is energized, a self holding circuit paralleling the palm switch 848 is made through relay switch contacts 875, the end-of-card switch 775 and thence to the same source of potential.

When relay 874 is energized, a second set of switch contacts 876 are closed to complete a circuit through the same mode switch bank 508-2, segment c, from the negative 24 volts, through a normally closed set of clamping switch contacts 877, through the coil of clamping solenoid 855 to ground. This causes energizing the coil of the clamping solenoid at full potential. When so energized, clamping solenoid 855 effects lowering of the card stop 778 and positively places the D-wheel 769 in its clamping position. Operation of solenoid 855 simultaneously opens contacts 877 and completes a circuit to permit operation by the system controller 648 by closing a second set of contacts 878. When contacts 877 are opened, the clamping solenoid coil still remains energized, although at a reduced potential, through a by-pass resistor 879 in parallel with contacts 877.

The controller 648 is now operative and the reperforator can start punching operation cycles which step the record along the table, passing it over the end-of-card feeler 774 which actuates the end-of-card switch 775 to its other position, closing contacts 880 to provide a by-pass circuit from the potential at mode-switch bank 508-2, segment c, to the card clamp solenoid. When end-of-card switch 775 is actuated, the holding circuit to the coil of the intermediate relay 874 is opened, thus the card clamping solenoid is now under sole control of contacts 880 in the end-of-card switch 775.

After the record card or the end record of a fanfold strip pases over the end-of-card feeler 774, the feeler is released and will raise to permit biased return of the end-of-card switch 775 to normal position, breaking the circuit to the card clamping solenoid 855, permitting switch contacts 877 to close in preparation for the next starting operation, opening the contacts 878 which through a circuit in the controller 648 prevents further reperforator operation, and permitting the card stop 778 and the D-wheel 769 to return to normal start positions.

The instant that D-wheel 769 raises away from the pre-feed wheel 651 its torsion spring 869 snaps the D-wheel 769 back to the normal position as seen in FIGURE 32. The machine will now be conditioned for the next card or first record of a fanfold strip to be inserted.

Note that a positioning of the mode switch 508 to a tape mode will open the clamping circuit from the negative 24 volt potential through mode switch bank 508-2, segment c, to the palm switch and preliminary feed operation then cannot be initiated during the tape mode of machine operation.

In FIGURES 19 and 36, there is shown a punch lockout key switch 800 which is used only in the event that certain code characters are not wanted when a special code group is being punched. If for instance, a tape was desired to be punched without certain symbols, e.g., the usual tab, letters, figures or spacing symbols, then the punch lockout key 800 would be pressed to energize a special electronic circuit in the controller 648. Such special circuits will electronically prevent energizing of punch solenoids for certain code signal combinations presented to the sensing mechanism of the machine 500.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A recording device for receiving coded data information signals and recording manifestations of such data information on a record medium comprising;
    (a) a planetary mechanism including at least two power input means one of which means includes as a planet component at least one rotatable member comprising an operator drum including:
        (1) a plurality of operator means placed at circumferentially spaced apart positions on the outer peripheral surface on the drum, each recording operator means passing through a distinct repetitive multiple peak cycloidal path;
    (b) power means connected to said one power input means to continually rotate said plurality of operator means about the axis of the planetary mechanism and simultaneously planetate said operator means to follow said cycloidal paths;
    (c) means providing a controllable connection between the other of said planetary input means and said power means to impart a rotational bias force to said other planetary input means;
    (d) recording mechanism, adapted to impart record data on a record medium positioned adjacent said planetary mechanism and including:
        (1) recording means adapted to be operated to record data on a record medium in accord with operative engagement by an operator means, the cycloidal peak of which is selected by selecting means to occur and make operative engagement at a position location coinciding with the location of recording means;
    (e) said selecting means including a portion of said other planetary input means and a plurality of selectively operable stop means adapted to engage said portion of said other input means to normally maintain said other planetary input means in a normal neutral position and to enable rotational shifting of said other planetary input means to a plurality of different fixed angular positions within a cycle of rotation whereby a relative rephasing of the cycloidal paths of movement of said operator means is enabled to assure operative engagement of selected ones of said operator means with recording means at one of said cycloidal peak positions with a subsequent relative rephasing of the cycloidal path to avoid subsequent operative engagements between selected operator means and said recording means; and
    (f) feed means enabling a relative movement between said record medium and said recording mechanism to enable successive spaced recording of data on the record medium.

2. A recording device as defined in claim 1, wherein:
 (a) said planetary mechanism includes as a planet component at least one planetary print drum comprising:
   (1) at least one circular peripheral row of type characters circumferentially spaced apart, each type character constituting a recording operator means and passing through a distinct repetitive cycloidal path during rotation of said planetary mechanism; and
 (b) said feed means includes means which guide a thin record medium between said operator means and said recording mechanism.

3. A recording device as defined in claim 2, wherein said recording means comprises:
 (a) a resilient platen device against which said operator means presses the record medium upon operation of said selecting means to enable engagement of said recording means by said operator means at a selected cycloidal peaking of said recording mechanism.

4. A recording device as defined in claim 1, wherein:
 (a) said power means is an electric motor;
 (b) said planetary mechanism has as said input means at least a carrier, a sun gear and at least one planet component rotatably mounted on said carrier and in gear meshed drive with said sun gear; and
 (c) drive means connected between said motor and said carrier to provide continual rotation of said carrier when said motor is energized.

5. A recording device as defined in claim 1, wherein said feed means comprises:
 (a) means to guide a thin sheet form record medium past a recording station;
 (b) a pin type record feed wheel rotatably mounted on the out-feed side of said recording station; and
 (c) means adapted to be power operated by said power means under cyclic control of said recording device to rotatably step said pin feed wheel the angular distance between adjacent feed pins once during each cycle of recording operation.

6. A recording device as defined in claim 1, wherein:
 (a) said operator drum includes:
   (1) a plurality of axially disposed rows of punch operator pins, the rows of pins being placed at circumferentially spaced apart positions on the outer peripheral surface of the drum, each row containing a permutated arrangement of pins constituting a code designation for specific information data and each pin constituting a said recording operator means; and
 (b) said recording mechanism includes a plurality of punched code hole recording means normally positioned in side by side alignment at operational positions in planar alignment with the cycloidal paths of associated ones of said pins and adapted to be permutatively operated to cause code holes to be punched in a record medium in accord with operative engagement by the permutated arrangement of pins in a row of pins, a cycloidal peak of which is selected by said epicyclic phase shifting to make operative engagement with the recording means.

7. A recording device as defined in claim 1, wherein:
 (a) said other planetary input means is a sun gear;
 (b) said means providing a controllable connection between said sun gear and said power means includes:
   (1) a drive shaft connected to the sun gear;
   (2) abutment stop means rotatable with said drive shaft; and
   (3) a slip coupling means between said drive shaft and said power means;
 (c) said portion of said other planetary input means included in said selecting means is said stop means, said shaft and said sun gear; and
 (d) said selectively operable stop means comprise:
   (1) a power operated stop member disposed in the path of rotation of said stop means and cyclically momentarily shiftable out of the path of rotation of said stop means to permit rotational movement of said sun gear; and
   (2) a plurality of individually selectively operative code stop devices each disposed adjacent the path of rotation of said stop means at an angular position different from each other and different from said stop member, operable to be selectively shifted in accord with a control signal into the path of rotation of said stop means as said stop member shifts out of the path of said stop means to permit a repositioning of said sun gear to thereby rephase the cycloidal paths of said operator members.

8. A recording device as defined in claim 7, wherein:
 (a) said stop means includes at least two stop arms, one of which is offset axially from the other and is offset circumferentially from the other an angular increment less than the angular distance between adjacent ones of said code stop devices;
 (b) said code stop devices are shiftable from a neutral position in either of two directions, one direction of shift placing a stop device into the path of rotation of one stop arm and the other direction of shift placing a stop device into the path of rotation of the other stop arm; and
 (c) means are included in said selecting means to predetermine the direction of shift of selectively operated stop devices.

9. A recording device for receiving coded data information signals and recording manifestations of such data information on a record medium, comprising:
 (a) a planetary mechanism including as a planet component at least one planetary print drum comprising:
   (1) at least one circular peripheral row of type character circumferentially spaced apart, each type character constituting a recording operator means and passing through a distinct repetitive cycloidal path during rotation of said planetary mechanism;
 (b) means mounting said planetary mechanism for rotation about an axis;
 (c) means, in said planetary mechanism, mounting said recording operator means for movement along the repetitive multiple peak cycloidal path around said axis;
 (d) power means connected to rotate said print drum about the axis of the planetary mechanism and simultaneously planetating said recording operator means to follow said cycloidal path;
 (e) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path, said recording means comprising at least
   (1) a single resiliently biased platen hammer having a face of sufficient area to overlay one of said type characters and normally biased toward the axis of said planetary mechanism, and
   (2) an ink ribbon disposed between said hammer and said planetary mechanism;
 (f) selecting means enabling a relative repositioning between said recording means and the cycloidal path of movement of said recording operator means to assure operative engagement of said operator means with said recording means at one of said cycloidal peak positions with a subsequent resetting of the relative positions to avoid operative engagement between said recording means and an operator means as it moves through the said one cycloidal peak; and (g) feed means enabling a relative movement between a record medium and said recording mechanism to enable successive spaced recording of data on the record medium and including means which guide a thin record medium between said operator means and said recording mechanism.

10. A recording device as defined in claim 9 for a page printer, wherein:

(a) said planetary print drum carries a plurality of circular peripheral rows of type characters circumferentially spaced apart with adjacent type characters in adjacent rows providing lines of identical type characters;

(b) means mounting said resiliently biased platen hammer for shifting movement parallel to the axis of said planetary mechanism; and (c) said feed means includes means to shift said platen hammer in recording data spacing steps across a record page and to return said platen to a start-of-line position.

11. A recording device for receiving coded data information signals and recording manifestations of such data information on a record medium, comprising:

(a) a planetary mechanism including at least one recording operator means passing through at least one repetitive multiple peak cycloidal path, said planetary mechanism further comprising at least a carrier, a sun gear and at least one planet component carrying said recording operator means rotatably mounted on said carrier and in gear meshed drive with said sun gear;

(b) means mounting said planetary mechanism for rotation about an axis;

(c) an electric motor and a first drive means connected between said motor and said carrier to provide continual rotation of said carrier when said motor is energized to rotate said operator means about the axis of the planetary mechanism and simultaneously planetating said operator means to follow said cycloidal path;

(d) means are provided for rotation of said sun gear and include
  (1) a rotatable member connected to said sun gear, and
  (2) a second drive means connected between said rotatable member and said motor including a friction slip coupling;

(e) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path;

(f) selecting means, including means to selectively permit changes in the incremental angular position of said sun gear under rotational force through said slip coupling to thereby change the phasing of the epicyclic rotation of the planet component which changes the positional occurrence of at least one of the cycloidal peaks of said operator means to assure operative engagement of said operator means with said recording means at one of said cycloidal peak positions with a subsequent resetting of the relative positions to avoid operative engagement between said recording means and an operator means as it moves through the said one cycloidal peak; and (g) feed means enabling a relative movement between a record medium and said recording mechanism to enable successive spaced recording of data on the record medium.

12. A recording device for receiving coded data information signals and recording manifestations of such data information on a record medium, comprising:

(a) a planetary mechanism including as a planet component at least one rotatable member comprising:
  (1) a plurality of terminal portions eccentric to the planet axis of the rotatable member constituting a plurality of recording operator means which pass through distinct repetitive multiple peak cycloidal paths during rotation of said planetary mechanism;

(b) means mounting said planetary mechanism for rotation about an axis;

(c) means, in said planetary mechanism, mounting said recording operator means for movement along the repetitive multiple peak cycloidal paths around said axis;

(d) power means connected to rotate said rotatable member about the axis of the planetary mechanism and simultaneously planetating said rotatable member so that said recording operator means follow said cycloidal paths;

(e) recording mechanism adapted to impart record data on a record medium positioned adjacent said planetary mechanism, said recording mechanism including a plurality of correlated print means and perforating means, each including recording means disposed approximate the circular path which includes all of said cycloidal peaks and normally located adjacent a position of intersection with a peak of said cycloidal path and said correlated recording means are selectively operated by recording operator means passing through a peak position of a cycloidal path;

(f) selecting means enabling a relative repositioning between said recording means and the cycloidal path of movement of said recording operator means to assure operative engagement of said recording operator means with said recording means at one of said cycloidal peak positions with a subsequent resetting of the relative positions to avoid operative engagement between said recording means and a recording operator means as it moves through the said one cycloidal peak; and (g) feed means enabling a relative movement between a record medium and said recording mechanism to enable successive spaced recording of data on the record medium.

13. A recording device for receiving coded data information signals and recording manifestations of such data information on a record medium, comprising:

(a) a planetary mechanism including as a planet component at least one rotatable member comprising:
  (1) a plurality of terminal portions eccentric to the planet axis of the rotatable member constituting a plurality of recording operator means which pass through distinct repetitive multiple peak cycloidal paths during rotation of said planetary mechanism;

(b) means mounting said planetary mechanism for rotation about an axis;

(c) means, in said planetary mechanism, mounting said recording operator means for movement along the repetitive multiple peak cycloidal path around said axis;

(d) power means connected to rotate said operator means about the axis of the planetary mechanism and simultaneously planetating said operator means to follow said cycloidal path;

(e) recording mechanism adapted to impart record data on a record medium positioned adjacent said planetary mechanism, said recording mechanism comprising a plurality of code punch and die sets with independent operating linkage, a portion of each operating linkage being an impact transfer lever and constituting a recording means disposed approximate the circular path which includes all of said cycloidal peaks and normally located adjacent a position of intersection with a peak of said cycloidal path;
(f) selecting means enabling a relative repositioning between selected ones of said impact transfer levers and the cycloidal paths of movement of said recording operator means to assure a desired operation of code punches representative of a specific punched code signal at one of said cycloidal peak positions with a subsequent resetting of the relative positions to avoid operative engagement between said impact transfer levers and a recording operator means as it moves through the said one cycloidal peak; and
(g) feed means enabling a relative movement between a record medium and said recording mechanism to enable successive spaced recording of data on the record medium.

14. A recording device as defined in claim 13, wherein:
(a) each code punch and die set operating linkage includes means operative subsequent to operative engagement by an operator means to immediately retract the punch from an operated position.

15. A recording device as defined in claim 14, wherein:
(a) said means to retract comprises springs, individual to each transfer lever, biasing said transfer lever to a punch retracting position.

16. A recording device for receiving coded data information signals and recording manifestations of such data information on a record medium, comprising:
(a) a planetary mechanism including as a planet component at least one rotatable member comprising an operator drum including:
 (1) a plurality of axially disposed rows of punch operator pins, the rows of pins being placed at circumferentially spaced apart positions on the outer peripheral surface on the drum, each row containing a permutated arrangement of pins constituting a code designation for specific information data and each pin constituting a recording operator means which passes through a repetitive multiple peak cycloidal path;
(b) means mounting said planetary mechanism for rotation about an axis, and
(c) means, in said planetary mechanism, mounting said drum for planetating movement so that said recording operator means moves along the repetitive multiple peak cycloidal paths around said axis;
(d) power means connected to rotate said operator means about the axis of the planetary mechanism and simultaneously planetating said operator means to follow said cycloidal path;
(e) recording mechanism adapted to impart record data on a record medium positioned adjacent said planetary mechanism and including a plurality of punched code hole recording means disposed approximate the circular paths which include said cycloidal peaks and normally located adjacent associated positions of intersection with peaks of said cycloidal paths and adapted to be permutatively operated to punch code holes in a record medium in accord with operative engagement by the permutated arrangement of pins in a row of pins, a cycloidal peak of the path of which is selected to occur and make operative engagement at a position location coinciding with the plurality of recording means;
(f) selecting means enabling a relative repositioning between said recording means and the cycloidal paths of movement of said recording operator means to assure operative engagement of a desired said recording operator means with said recording means at one of said cycloidal peak positions with a subsequent resetting of the relative positions to avoid operative engagement between said recording means and any recording operator means as they continue to move through their cycloidal peaking paths; and
(g) feed means enabling a relative movement between a record medium and said recording mechanism to enable successive spaced recording of data on the record medium.

17. A recording device for receiving coded data information signals and recording manifestations of such data information on a record medium, comprising:
(a) said planetary mechanism includes at least two power input means and a planetating member;
 (1) said planetating member including at least one recording operator means passing through at least one repetitive multiple peak cycloidal path;
(b) means mounting said planetary mechanism for rotation about an axis, and
(c) means, in said planetary mechanism, mounting said recording operator means for movement along the repetitive multiple peak cycloidal path around said axis;
(d) rotary power means;
(e) means provide a direct connection between one of said planetary input means and said power means and said power means to impart continual rotational drive to said one planetary input means resulting in epicyclic rotation of said planetary mechanism;
(f) means provide a controllable connection between the other of said planetary input means and said power means to impart a rotational bias force to said other planetary input means;
(g) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path;
(h) selecting means enabling a relative respositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak, said selecting means including a portion of said other planetary input means and a plurality of selectively operable stop means adapted to engage said portion of said other input means to normally maintain said other planetary input means in a normal neutral position where no recording operator means has a peaking position, in its cycloidal path which occurs at said operating position of said recording means, and to enable rotational shifting of said other planetary input means to a plurality of different fixed angular positions within a cycle of rotation whereby the phase of the epicyclic rotation of the planetary mechanism can be shifted relative to said operational position of said recording mechanism; and
(i) feed means enabling a relative movement between a record medium and said recording mechanism to enable successive spaced recording of data on the record medium.

18. A recording device as defined in claim 17, wherein:
(a) said planetary mechanism includes as a rotatable planet member, an operating drum including:
 (1) a plurality of axially disposed rows of punch operator pins, the rows of pins being placed at circumferentially spaced apart positions on the outer peripheral surface of the drum, each row containing a permutated arrangement of pins constituting a code designation for specific information data and each pin constituting a said recording operator means; and (b) said recording mechanism includes a plurality of punched code hole recording means normally positioned in side by side alignment at operational positions in planar alignment with the cycloidal paths of associated ones of said pins and adapted to be permutatively operated to cause code holes to be punched in a record medium in accord with operative engagement by the permutated arrangement of pins in a row of pins, a cycloidal peak of which is selected by said epicyclic phase shifting to make operative engagement with the recording means.

19. A recording device as defined in claim 17, wherein:

(a) said planetary mechanism includes as a rotatable planet member, at least one planetary print drum including:
  (1) at least one circular peripheral row of type characters circumferentially spaced apart, each type character constituting a recording operator means and passing through a distinct repetitive cycloidal path during rotation of said planetary mechanism;
(b) said feed means is disposed to position a thin record medium between said operator means and said recording means;
(c) said recording mechanism comprises a single resiliently biased platen hammer having a face of sufficient size to overlay one of said type characters and normally biased toward the axis of said planetary mechanism;
(d) an ink ribbon disposed between said hammer and said planetary mechanism;
(e) a blank space is disposed in lieu of one of the circumferentially spaced apart type characters;
(f) the cycloidal path of said blank position passes through a cycloidal peak position which normally intersects the operating position of said recording mechanism; and
(g) said selecting means constitutes means capable of selecting a plurality of said different fixed angular positions of said other input means equal to the number of type characters in said row and assuring rotational return of said other input means to a normal "blank" position.

20. A recording device as defined in claim 17, wherein:

(a) said planetary mechanism includes as a rotatable planet member, at least one planetary drum including:
  (1) a plurality of said recording operator means placed at circumferentially spaced apart positions on the outer peripheral surface of the drum, each recording operator means passing through a distinct repetitive cycloidal path during rotation of said planetary mechanism;
(b) a blank space is disposed in lieu of one of the circumferentially spaced apart recording operator means;
(c) the cycloidal path of said blank position passes through a cycloidal peak position which normally intersects the operating position of said recording mechanism and constitutes a neutral selection position; and
(d) said selecting means constitutes means capable of selecting a plurality of said different fixed angular positions of said other input means equal to the number of circumferentially spaced apart positions of said recording operator means and assuring rotational return of said other input means to a neutral or "blank" selection position.

21. A recording device for receiving coded data information signals and recording manifestations of such data information on a record medium, comprising:

(a) a planetary mechanism including a plurality of recording operator means passing through associated repetitive multiple peak cycloidal paths, said planetary mechanism including as a planet component at least one rotatable operator drum including:
  (1) a plurality of axially disposed rows of punch operator pins, the rows of pins being placed at circumferentially spaced apart positions on the outer peripheral surface of the drum, each row containing a permutated arrangement of pins constituting a code designation for specific information data and each pin constituting a said recording operator means;
(b) means mounting said planetary mechanism for rotation about an axis, and
(c) means, in said planetary mechanism, mounting said drum for rotation as a planet member whereby said recording operator means will move along repetitive multiple peak cycloidal paths around said axis;
(d) power means connected to rotate said drum about the axis of the planetary mechanism and simultaneously planetating said recording operator means to follow said cycloidal path;
(e) recording mechanism adapted to impart record data on a record medium positioned adjacent said planetary mechanism and including recording means disposed approximate the circular paths which include said cyloidal peaks and normally located adjacent positions of intersection with peaks of said cycloidal paths;
(f) selecting means enabling a relative respositioning between said recording means and the cycloidal path of movement of said recording operator means to assure operative engagement of said recording operator means with said recording means at one of said cycloidal peak positions with a subsequent resetting of the relative positions to avoid operative engagement between said recording means and recording operator means as they continue to move through said cycloidal peaks; and
(g) feed means enabling a relative movement between a record medium and said recording mechanism to enable successive spaced recording of data on the record medium;
(h) said recording mechanism includes a plurality of punched code hole recording means adapted to be permutatively operated to punch code holes in a record medium in accord with operative engagement by the permutated arrangement of pins in a row of pins, the cycloidal peak position of the pins in a row of pins being selected by said selecting means to occur at the position of said recording means and make operative engagement therewith;
(i) each row of pins includes as a feed step operator means, a pin which is fixed with fractional angular offset relative to said permutated group of code pins; and
(j) said feed means includes:
  (1) an impact transfer member disposed adjacent the cycloidal peak operational position of said recording means and in planar alignment with the cycloidal path of said feed step operator pin and adapted to be operatively engaged by a said feed step operator pin associated with a selected row of pins a fraction of an instant after operation of said punches associated with said selected row of pins; and
  (2) means connected to and operated by said impact transfer member to engage and feed a record medium one indexing step.

22. In a record punch:
(a) a frame;
(b) a record feeding and supporting means;
(c) a punch supporting member secured adjacent said supporting means;
(d) a plurality of punch elements spaced and reciprocably supported in said punch supporting member;
(e) intermediate punch operating members operatively connected to the associated one of said punch elements;
(f) a plurality of punch operators spaced and rotatably supported about the periphery of a rotatable member mounted in said frame and adapted to selectively cooperate with said intermediate punch operating members to move them through an operating cycle;
(g) a planetary gear connected to each of said plurality of punch operators;
(h) a sun gear rotatably and coaxially mounted relative to said rotatable member and meshed with said planetary gears; and
(i) means for selectively rotatably positioning said sun gear to control the phasing position of the hypocycloidal path of said punch operators relative to associated ones of said intermediate members.

References Cited by the Examiner
UNITED STATES PATENTS

| | | | |
|---|---|---|---|
| 2,772,878 | 12/56 | Wusteney et al. | 178—42 |
| 2,931,861 | 4/60 | Auwaerter | 178—92 |
| 2,969,442 | 1/61 | Sim | 178—92 |
| 2,997,542 | 8/61 | Inoue | 178—34 |
| 3,003,032 | 10/61 | Haggadone | 178—92 |
| 3,014,095 | 12/61 | Kleinschmidt et al. | 178—92 |

NEIL C. READ, *Primary Examiner.*
ROBERT H. ROSE, *Examiner.*

UNITED STATES PATENT OFFICE
CERTIFICATE OF CORRECTION

Patent No. 3,205,305　　　　　　　　　　　　　　　　September 7, 1965

Clayton H. Clark et al.

It is hereby certified that error appears in the above numbered patent requiring correction and that the said Letters Patent should read as corrected below.

Column 6, line 50, for "digaram" read -- diagram --; column 10, line 67, for "gate" read -- gates --; column 14, line 35, for "Page printer variations", in italics, read -- Page printer variations of planetary print head --, in italics; column 27, line 44, after "clamping" insert -- solenoid --; line 46, strike out "slot"; column 28, line 51, for "206" read -- 506 --; column 29, line 61, for "pases" read -- passes --; column 36, line 24, strike out "and said power means".

Signed and sealed this 19th day of July 1966.

(SEAL)
Attest:

ERNEST W. SWIDER
Attesting Officer

EDWARD J. BRENNER
Commissioner of Patents